(12) United States Patent
Rockwell et al.

(10) Patent No.: US 9,427,133 B2
(45) Date of Patent: Aug. 30, 2016

(54) DISHWASHER INSULATION BLANKET

(71) Applicant: Owens Corning Intellectual Capital, LLC, Toledo, OH (US)

(72) Inventors: Anthony L. Rockwell, Pickerington, OH (US); Phillip J. Johnson, Louisville, KY (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/643,918

(22) Filed: Mar. 10, 2015

(65) Prior Publication Data

US 2015/0250375 A1  Sep. 10, 2015

Related U.S. Application Data

(60) Provisional application No. 61/950,566, filed on Mar. 10, 2014.

(51) Int. Cl.
| | |
|---|---|
| *A47B 77/06* | (2006.01) |
| *A47L 15/42* | (2006.01) |
| *B32B 11/10* | (2006.01) |
| *B32B 17/06* | (2006.01) |
| *B32B 7/12* | (2006.01) |
| *B32B 11/02* | (2006.01) |

(Continued)

(52) U.S. Cl.
CPC ........ *A47L 15/4255* (2013.01); *A47L 15/4246* (2013.01); *A47L 15/4257* (2013.01); *B32B 3/04* (2013.01); *B32B 7/12* (2013.01); *B32B 11/02* (2013.01); *B32B 11/06* (2013.01); *B32B 11/10* (2013.01); *B32B 17/06* (2013.01); *B32B 2262/101* (2013.01); *B32B 2307/102* (2013.01); *B32B 2307/54* (2013.01); *B32B 2509/00* (2013.01)

(58) Field of Classification Search
CPC ........... A47L 15/4255; A47L 15/4246; A47L 15/4257; D06F 39/12; B32B 3/04; B32B 11/02; B32B 11/06; B32B 11/10; B32B 17/06; B32B 2509/00
USPC ....................................................... 312/228
See application file for complete search history.

(56) References Cited

U.S. PATENT DOCUMENTS

| | | |
|---|---|---|
| 4,295,692 A | 10/1981 | Jenkins |
| 5,094,318 A | 3/1992 | Maeda et al. |
| 5,755,900 A * | 5/1998 | Weir et al. ................... 156/62.2 |

(Continued)

FOREIGN PATENT DOCUMENTS

| | | |
|---|---|---|
| CN | 102459486 | 5/2012 |
| DE | 4110291 | 10/1992 |

(Continued)

OTHER PUBLICATIONS

International Search Report and Written Opinion from PCT/US15/019732 dated Jun. 1, 2015.

*Primary Examiner* — Hanh V Tran
(74) *Attorney, Agent, or Firm* — Calfee, Halter & Griswold LLP

(57) ABSTRACT

A dishwasher insulation blanket includes a sound absorbing layer, a sound reflecting layer; and a heat activated adhesive layer on a first side of the sound reflecting layer. The heat activated adhesive layer is configured to be activated by heat that emanates from a dishwasher during normal operation of the dishwasher.

18 Claims, 17 Drawing Sheets

(51) Int. Cl.
  *B32B 11/06* (2006.01)
  *B32B 3/04* (2006.01)

(56) References Cited

U.S. PATENT DOCUMENTS

| | | | |
|---|---|---|---|
| 5,855,353 A | 1/1999 | Shaffer et al. | |
| 5,965,851 A * | 10/1999 | Herreman et al. | 181/200 |
| 6,196,029 B1 | 3/2001 | Melia et al. | |
| 6,539,955 B1 * | 4/2003 | Tilton et al. | 134/58 D |
| 6,807,700 B2 | 10/2004 | Panther et al. | |
| 7,128,561 B2 | 10/2006 | Rockwell et al. | |
| 7,159,836 B2 | 1/2007 | Parks et al. | |
| 7,226,879 B2 | 6/2007 | Tilton et al. | |
| 7,357,974 B2 | 4/2008 | Rockwell | |
| 7,748,796 B2 | 7/2010 | Rockwell et al. | |
| 7,827,753 B2 | 11/2010 | Nagarajan et al. | |
| D629,556 S | 12/2010 | Alter | |
| 7,923,092 B2 | 4/2011 | Rockwell | |
| 8,590,670 B1 * | 11/2013 | Grube | E04F 15/203 181/286 |
| 2003/0170453 A1 * | 9/2003 | Foss | A01N 57/16 428/373 |
| 2005/0029148 A1 * | 2/2005 | Rust | B65D 81/3272 206/523 |
| 2005/0148259 A1 * | 7/2005 | Tilton | B60R 13/08 442/357 |
| 2005/0191921 A1 | 9/2005 | Tilton et al. | |
| 2006/0008614 A1 | 1/2006 | Rockwell et al. | |
| 2006/0008616 A1 | 1/2006 | Dean et al. | |
| 2006/0029810 A1 | 2/2006 | Markovitz et al. | |
| 2006/0141884 A1 * | 6/2006 | Haque | 442/361 |
| 2006/0234590 A1 | 10/2006 | Griffin et al. | |
| 2006/0249879 A1 * | 11/2006 | Gypen | B32B 37/22 264/259 |
| 2006/0254855 A1 * | 11/2006 | Loftus et al. | 181/293 |
| 2006/0266385 A1 | 11/2006 | Malaker | |
| 2007/0054090 A1 | 3/2007 | Rockwell | |
| 2007/0212970 A1 | 9/2007 | Rockwell et al. | |
| 2007/0243366 A1 | 10/2007 | Tilton et al. | |
| 2007/0272285 A1 * | 11/2007 | Herreman et al. | 134/58 D |
| 2008/0001431 A1 | 1/2008 | Thompson et al. | |
| 2008/0128005 A1 | 6/2008 | Haeberle et al. | |
| 2008/0145630 A1 | 6/2008 | Rockwell | |
| 2008/0289664 A1 | 11/2008 | Rockwell et al. | |
| 2008/0317996 A1 | 12/2008 | Rockwell | |
| 2009/0038980 A1 | 2/2009 | Rockwell et al. | |
| 2009/0094908 A1 | 4/2009 | Krueger et al. | |
| 2009/0288692 A1 * | 11/2009 | Haeberle et al. | 134/58 D |
| 2009/0301022 A1 | 12/2009 | Rockwell et al. | |
| 2009/0324915 A1 * | 12/2009 | Swift et al. | 428/219 |
| 2010/0024851 A1 | 2/2010 | Rockwell et al. | |
| 2011/0069498 A1 | 3/2011 | Alter et al. | |
| 2011/0086214 A1 | 4/2011 | Rockwell | |
| 2011/0185682 A1 * | 8/2011 | Rockwell et al. | 53/461 |
| 2011/0233086 A1 | 9/2011 | Rockwell et al. | |
| 2012/0012420 A1 | 1/2012 | Classen et al. | |
| 2012/0169194 A1 | 7/2012 | Maderic et al. | |
| 2012/0200210 A1 | 8/2012 | Rockwell | |
| 2012/0298154 A1 * | 11/2012 | Rockwell et al. | 134/184 |
| 2013/0174435 A1 | 7/2013 | Rockwell et al. | |
| 2013/0193826 A1 | 8/2013 | Fritz et al. | |
| 2013/0266787 A1 | 10/2013 | Rockwell et al. | |
| 2013/0337205 A1 | 12/2013 | Rockwell et al. | |
| 2014/0230497 A1 | 8/2014 | Rockwell et al. | |
| 2015/0097472 A1 | 4/2015 | Rockwell | |
| 2015/0218803 A1 | 8/2015 | Rockwell et al. | |
| 2015/0233110 A1 | 8/2015 | Alter et al. | |
| 2015/0250375 A1 | 9/2015 | Rockwell et al. | |
| 2015/0368852 A1 | 12/2015 | Rockwell et al. | |

FOREIGN PATENT DOCUMENTS

| | | |
|---|---|---|
| DE | 19858002 | 6/2000 |
| EP | 596972 | 3/2000 |
| EP | 992975 | 4/2000 |
| EP | 2446797 | 5/2012 |
| EP | 2484266 | 8/2012 |
| WO | 97/45671 | 12/1997 |
| WO | 98/30831 | 7/1998 |
| WO | 01/92618 | 12/2001 |
| WO | 2011/084953 | 7/2011 |
| WO | 2013/060631 | 5/2013 |

* cited by examiner

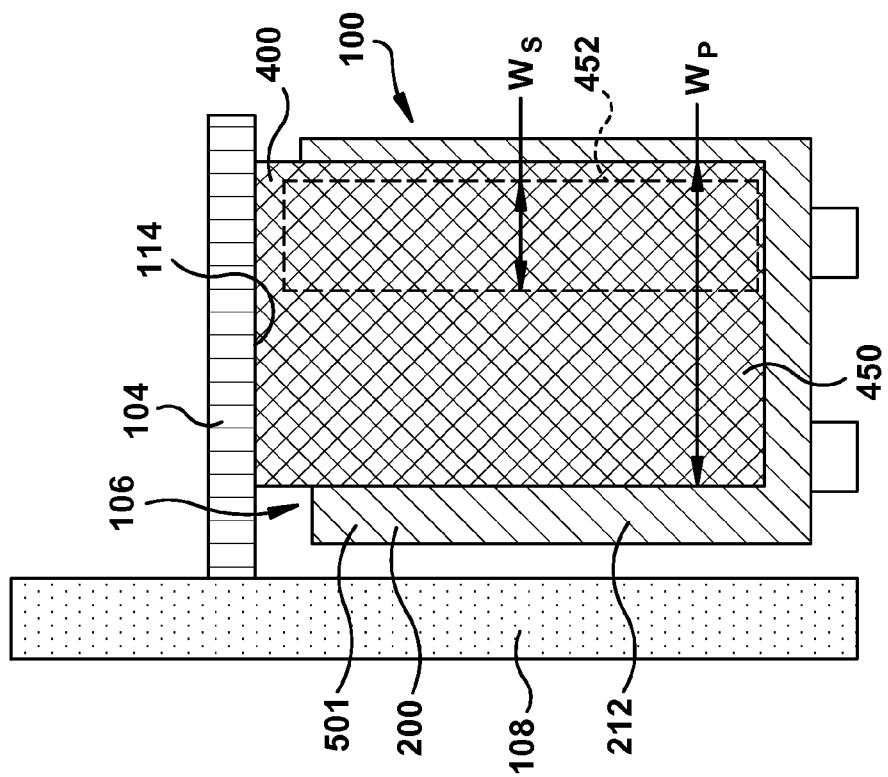
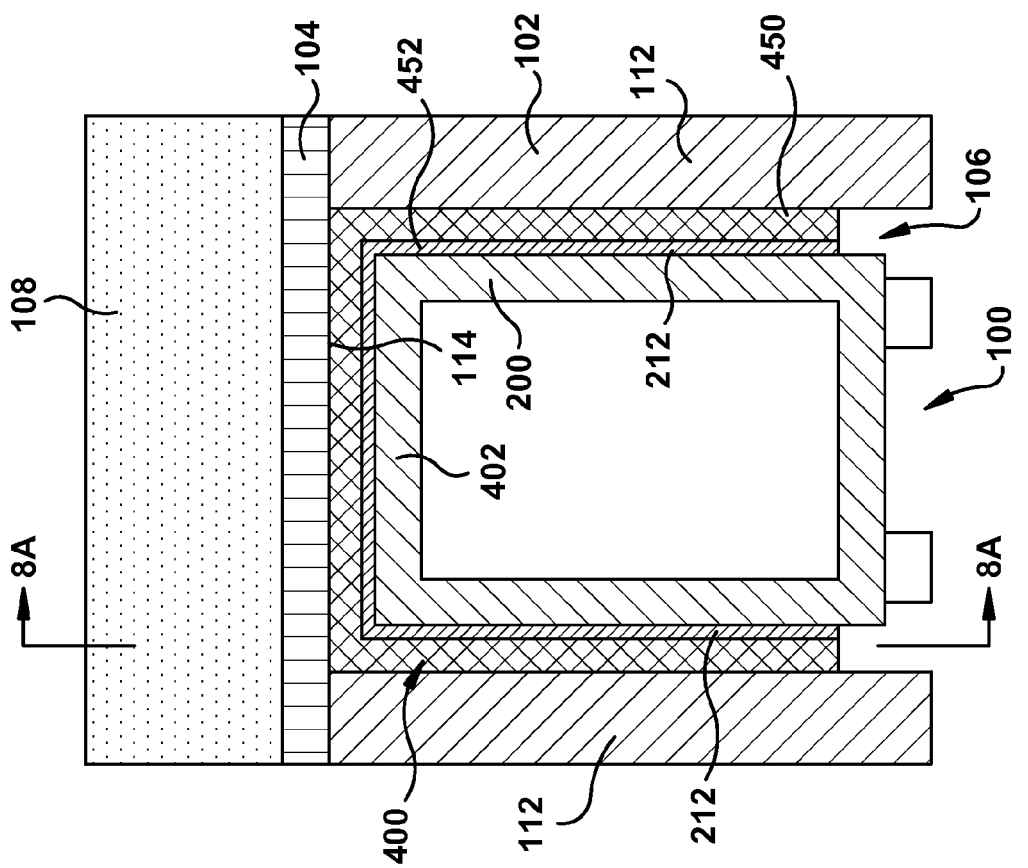
Fig. 8A
Fig. 7A

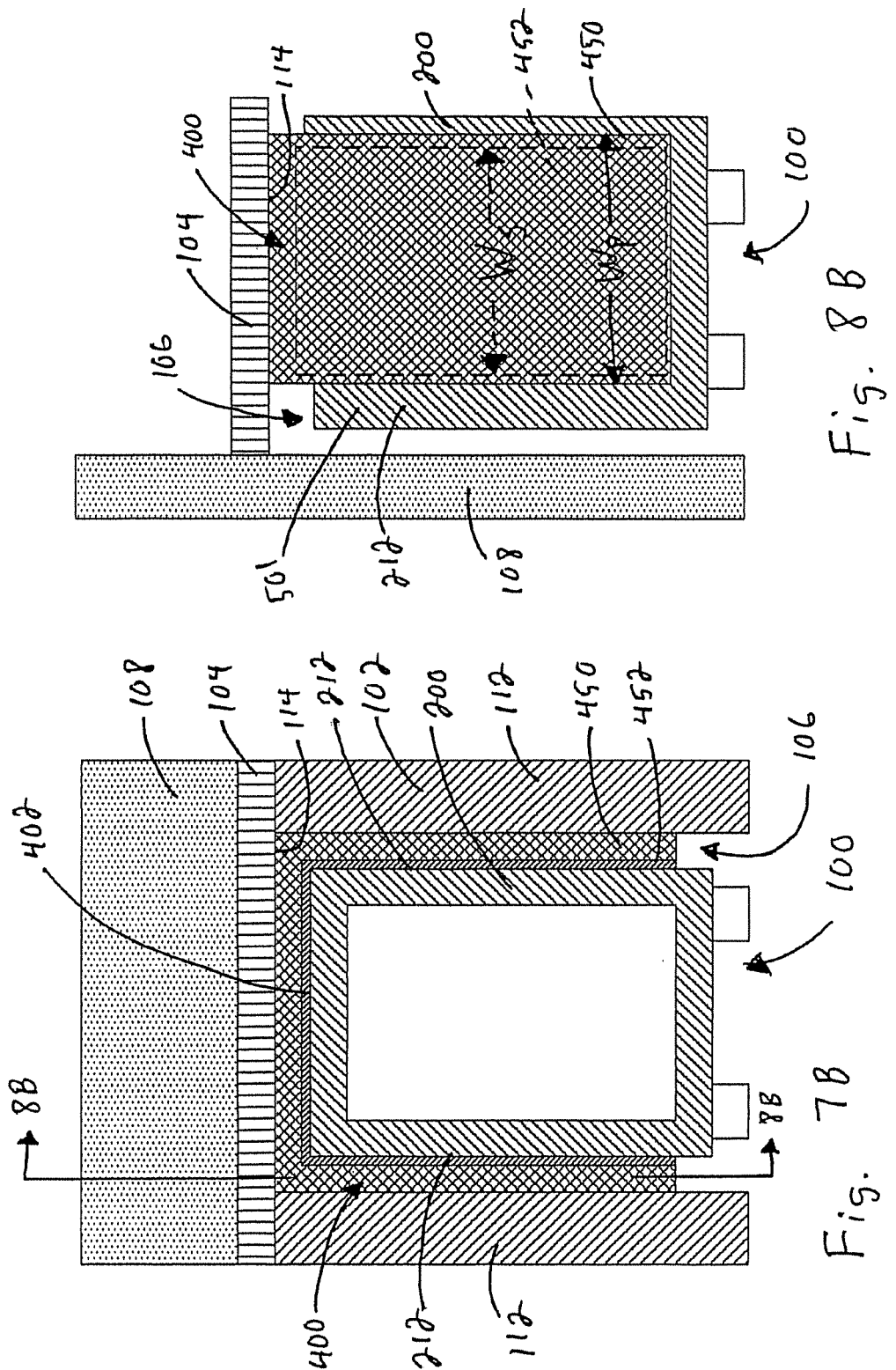

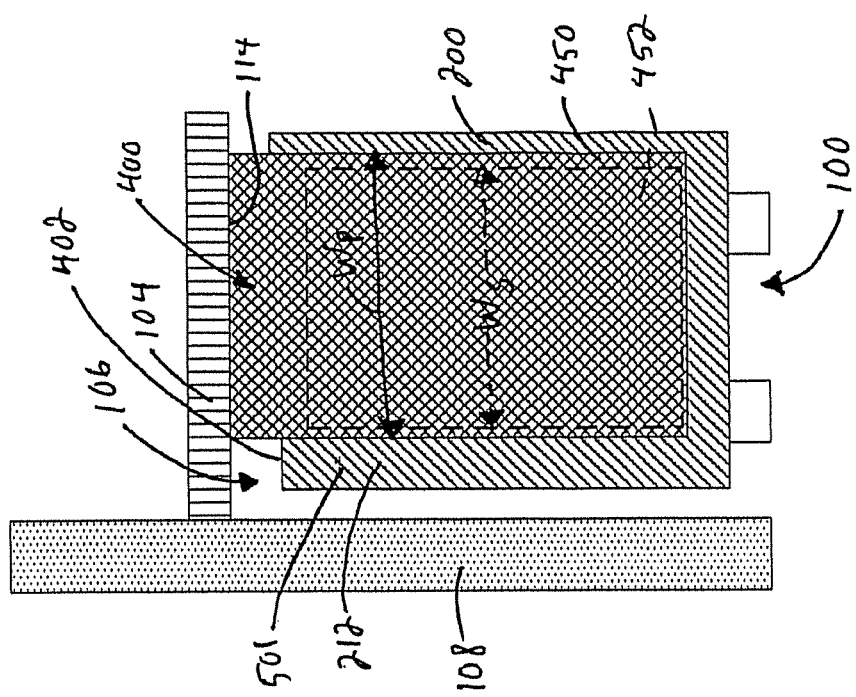
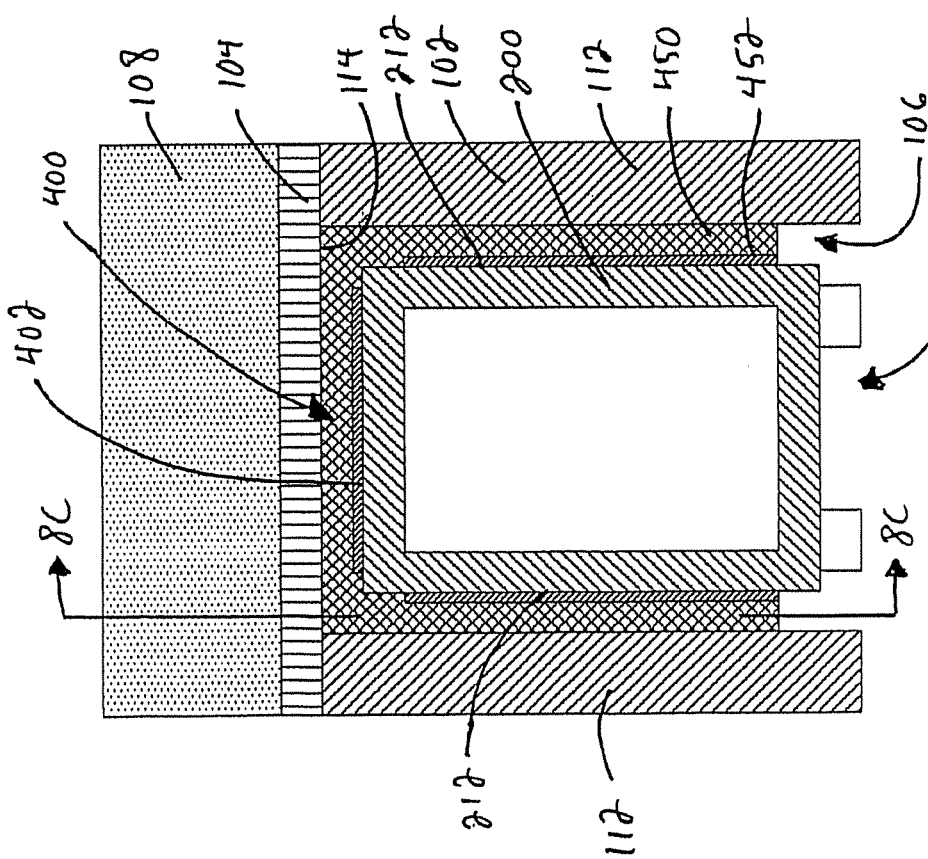
Fig. 7C
Fig. 8C

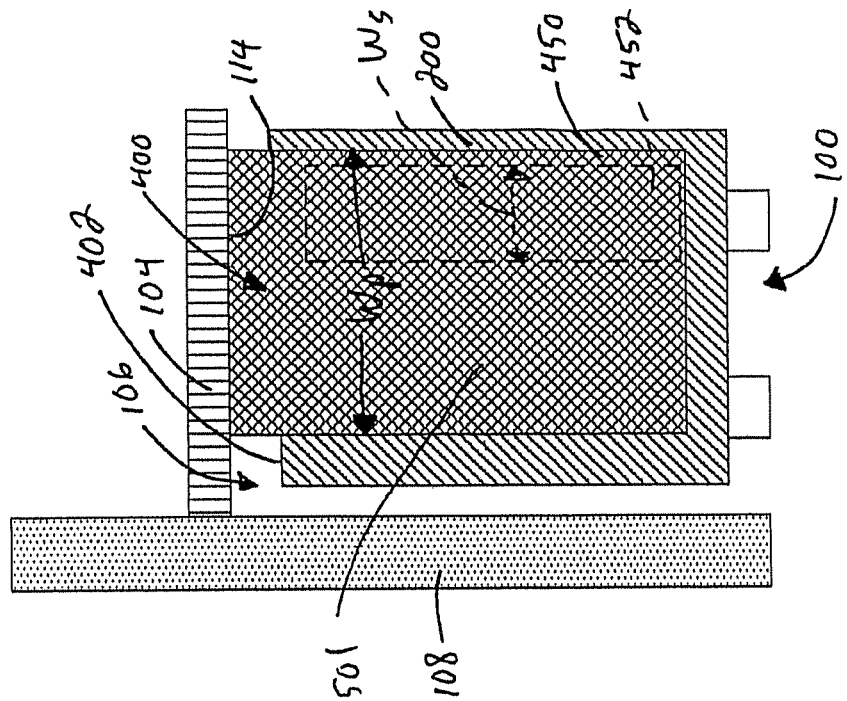
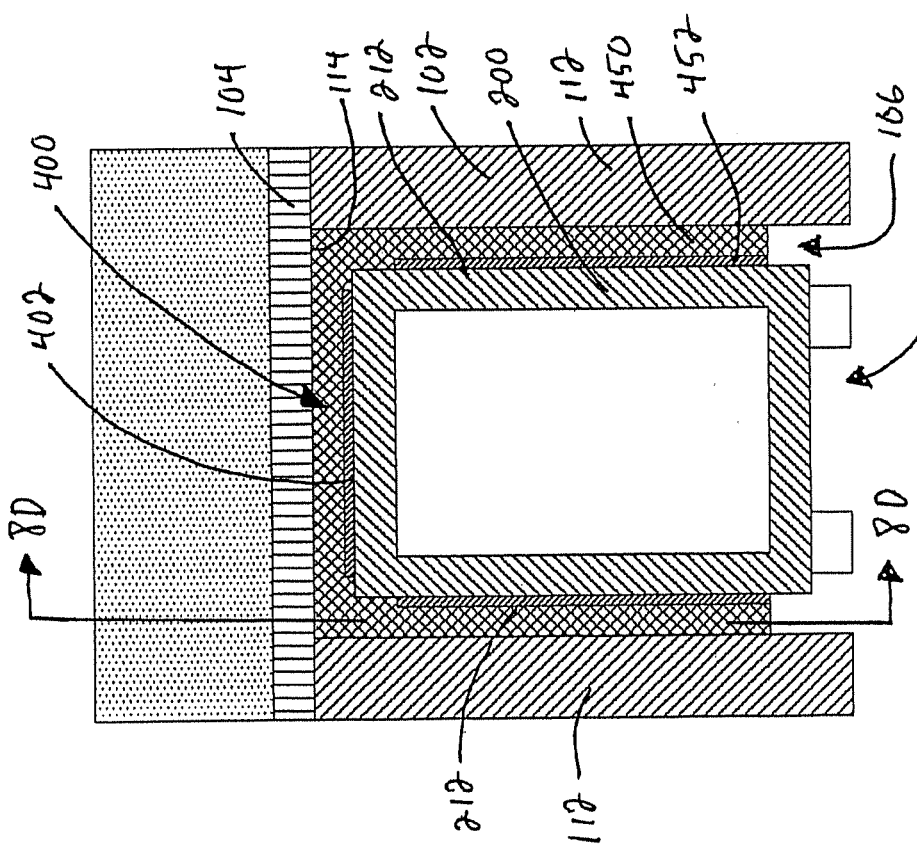

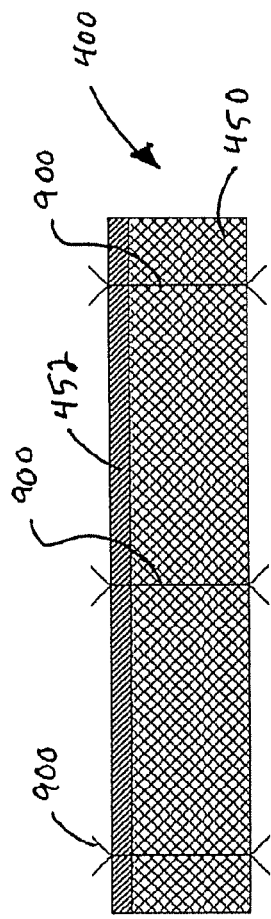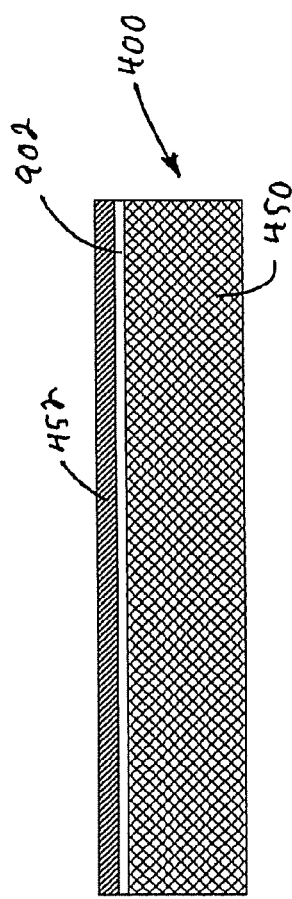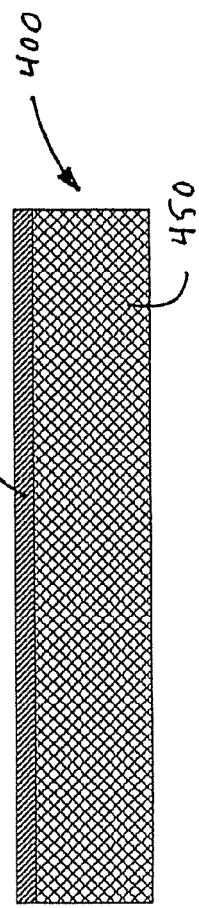

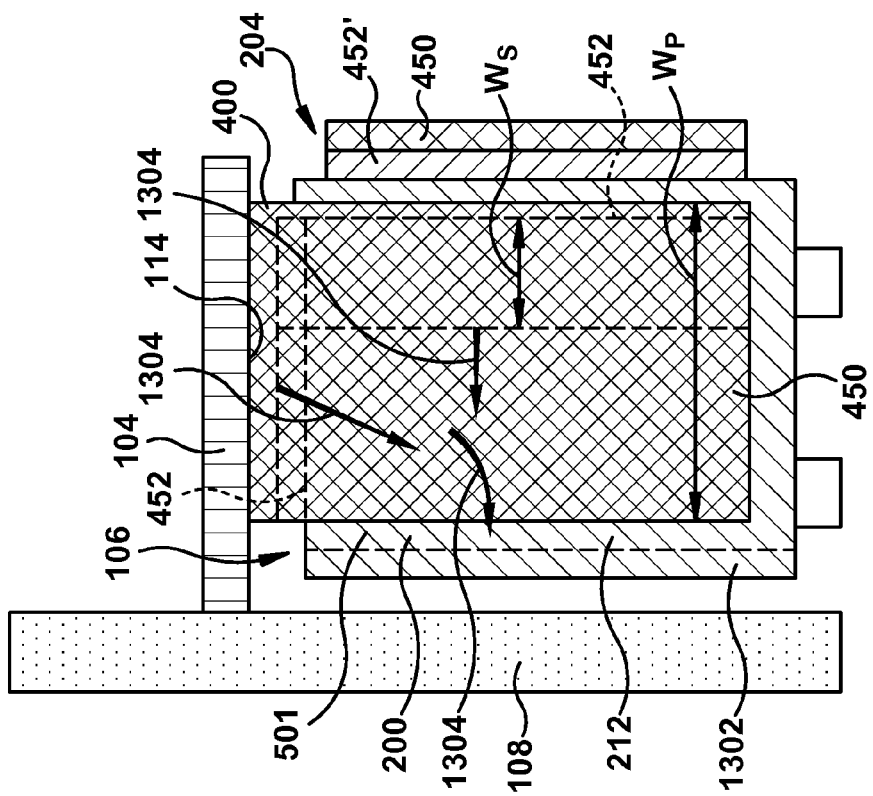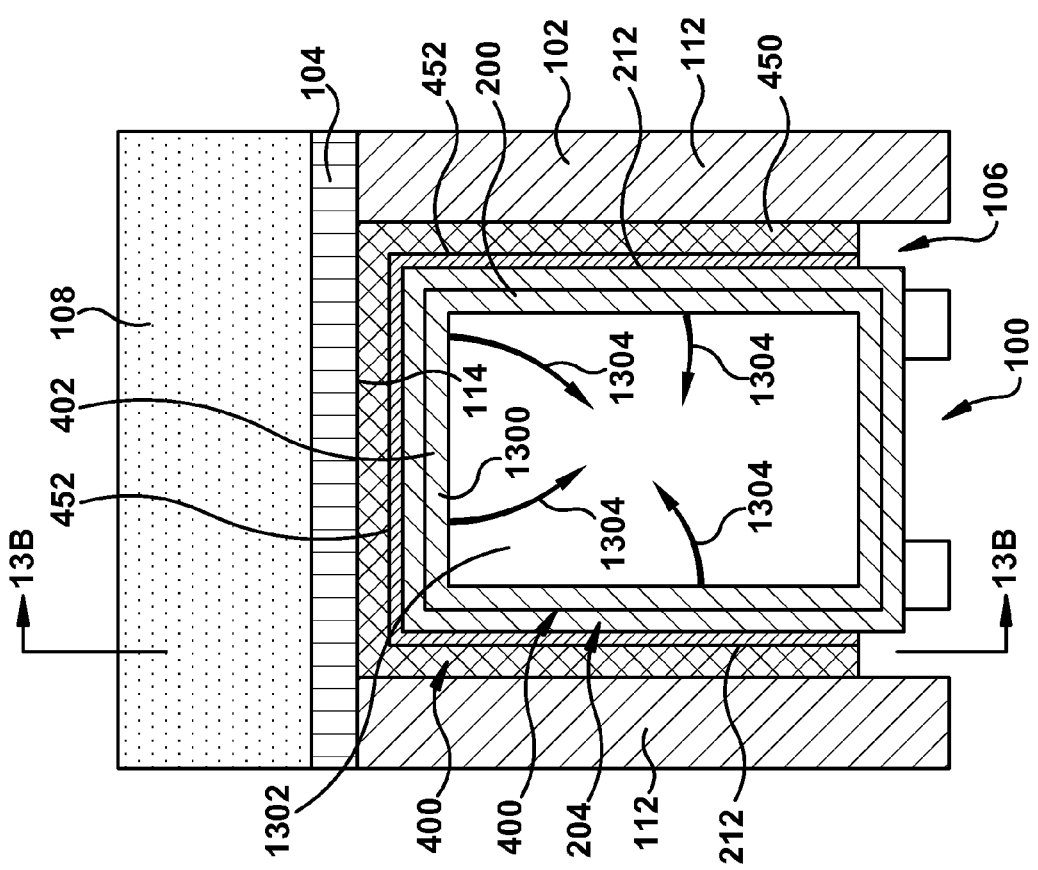
Fig. 13B
Fig. 13A

DISHWASHER INSULATION BLANKET

RELATED APPLICATION

The present application claims the benefit of U.S. provisional patent application Ser. No. 61/950,566, titled "Dishwasher Insulation Blanket," filed on Mar. 10, 2014. U.S. provisional patent application Ser. No. 61/950,566 is incorporated herein by reference in its entirety.

FIELD OF INVENTION

The present invention relates generally to the field of dishwashers and more particularly to insulation blankets for dishwashers.

BACKGROUND

Various types of dishwashers have been utilized in the domestic and commercial industries. The technology used to operate the dishwashers has largely remained consistent over the past few years. Although dishwashers vary in size and shape, their function is consistent; dishes inside the dishwasher are cleaned by water which is heated to sanitizing temperatures. Dishwashers may also include an option to add detergents to the wash cycle as well as an option to add a drying cycle at the end of the wash cycle.

Typically, a dishwasher has a tub with an interior surface and an exterior surface. Water is supplied to and removed from the interior surface of the tub by a pump assembly. The water may be supplied through a manifold that vents to the inside of the tub. The water supplied is heated to a predetermined sanitizing temperature by utilizing either an in line heater within the pump assembly or a heating element disposed inside the tub. For example, in many traditional dishwashers, the heating element is a heating coil. The heating element may also be utilized to heat the air inside the tub, which also assists in the drying of contents within the tub.

Appliances, such as dishwashers, washers, dryers and other machines that generate noise are usually provided with acoustical insulation to reduce the levels of sound emanating from the machines. The unwanted sound from these machines can be caused both by the mechanical operation of the motor within the machine and by the vibration of the machine itself. In a residential dwelling, excessive noise may be generated by dishwashers, clothes washers and clothes dryers, which can be annoying to inhabitants of the dwelling.

Conventional acoustical treatments for machines generally comprises sound transmission barriers and sound absorption layers. One form of acoustical insulation involves enclosing the noise source in an insulation structure. A typical form of acoustical insulation is a layer of mineral fiber insulation, such as fiberglass insulation, wrapped around or positioned around the source of unwanted noise. For example, a fiberglass absorber is usually incorporated in the front door panel of an under-the-counter dishwasher. The blanket of glass fibers absorbs some of the sound energy entering the fiberglass board, thereby resulting in a reduced transmission of unwanted sound from the source of sound in the appliance. Further, it is known that the insertion of a reflecting sound barrier within the acoustical insulation also reduces the sound transmission through the insulation product. Reflecting sound barriers in the past have been made of paper and also of a thin layer of polymeric material, as well as of other materials such as asphalt. U.S. Pat. No. 5,094,318 to Maeda et al. discloses a sound absorption material for automobiles which includes a damping layer, which may act as a sound reflection barrier, a sound absorption layer which absorbs acoustical energy, and a surfacing material. The damping layer can be purely asphalt, or an asphalt modified with resins and polymers. The sound absorption layer can be a foamed material or a fibrous material such as a mineral fiber blanket. U.S. Pat. No. 5,965,851 to Herreman et al. discloses an acoustically insulated apparatus, such as a dishwasher or a washing machine. U.S. Pat. No. 5,965,851 to Herreann et al. is incorporated herein by reference in its entirety.

SUMMARY

The present patent application discloses exemplary embodiments of dishwasher insulation blankets. The dishwasher insulation blankets include a sound absorbing layer, a sound reflecting layer, and a heat activated adhesive layer on a first side of the sound reflecting layer. The heat activated adhesive layer is configured to be activated by heat that emanates from the dishwasher during normal operation of the dishwasher, such as a first run of the dishwasher.

BRIEF DESCRIPTION OF THE SEVERAL VIEWS OF THE DRAWINGS

The accompanying drawings, which are incorporated in and constitute a part of this specification, illustrate some embodiments disclosed herein, and together with the description, serve to explain principles of the embodiments disclosed herein.

FIG. 7A is a sectional view taken along the plane indicated by lines 7A-7A in FIG. 4A and also showing the cabinet and countertop;

FIG. 7B is a sectional view taken along the plane indicated by lines 7B-7B in FIG. 4B and also showing the cabinet and countertop;

FIG. 7C is a sectional view taken along the plane indicated by lines 7C-7C in FIG. 4C and also showing the cabinet and countertop;

FIG. 7D is a view of an embodiment similar to the embodiment shown in FIG. 7C;

FIG. 8A is a sectional view taken along the plane indicated by lines 8A-8A in FIG. 7A;

FIG. 8B is a sectional view taken along the plane indicated by lines 8B-8B in FIG. 7B;

FIG. 8C is a sectional view taken along the plane indicated by lines 8C-8C in FIG. 7C;

FIG. 8D is a sectional view taken along the plane indicated by lines 8D-8D in FIG. 7D;

FIG. 9A is a sectional view of an exemplary embodiment of an insulation blanket;

FIG. 9B is a sectional view of an exemplary embodiment of an insulation blanket;

FIG. 9C is a sectional view of an exemplary embodiment of an insulation blanket;

FIG. 13A is a sectional view similar to the view of FIG. 7A showing an exemplary embodiment of an insulated dishwasher, a cabinet, and a countertop;

FIG. 13B is a sectional view taken along the plane indicated by lines 13B-13B in FIG. 13B and also showing the cabinet and countertop;

DETAILED DESCRIPTION

The embodiments disclosed herein will now be described by reference to some more detailed embodiments, in view of the accompanying drawings. These embodiments may, however, be embodied in different forms and should not be construed as limited to the embodiments set forth herein. Rather, these embodiments are provided so that this disclosure will be thorough and complete, and will fully convey the scope of the inventions to those skilled in the art.

Unless otherwise defined, all technical and scientific terms used herein have the same meaning as commonly understood by one of ordinary skill in the art to which these embodiments belong. The terminology used in the description herein is for describing particular embodiments only and is not intended to be limiting of the embodiments. As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

Figure 1:
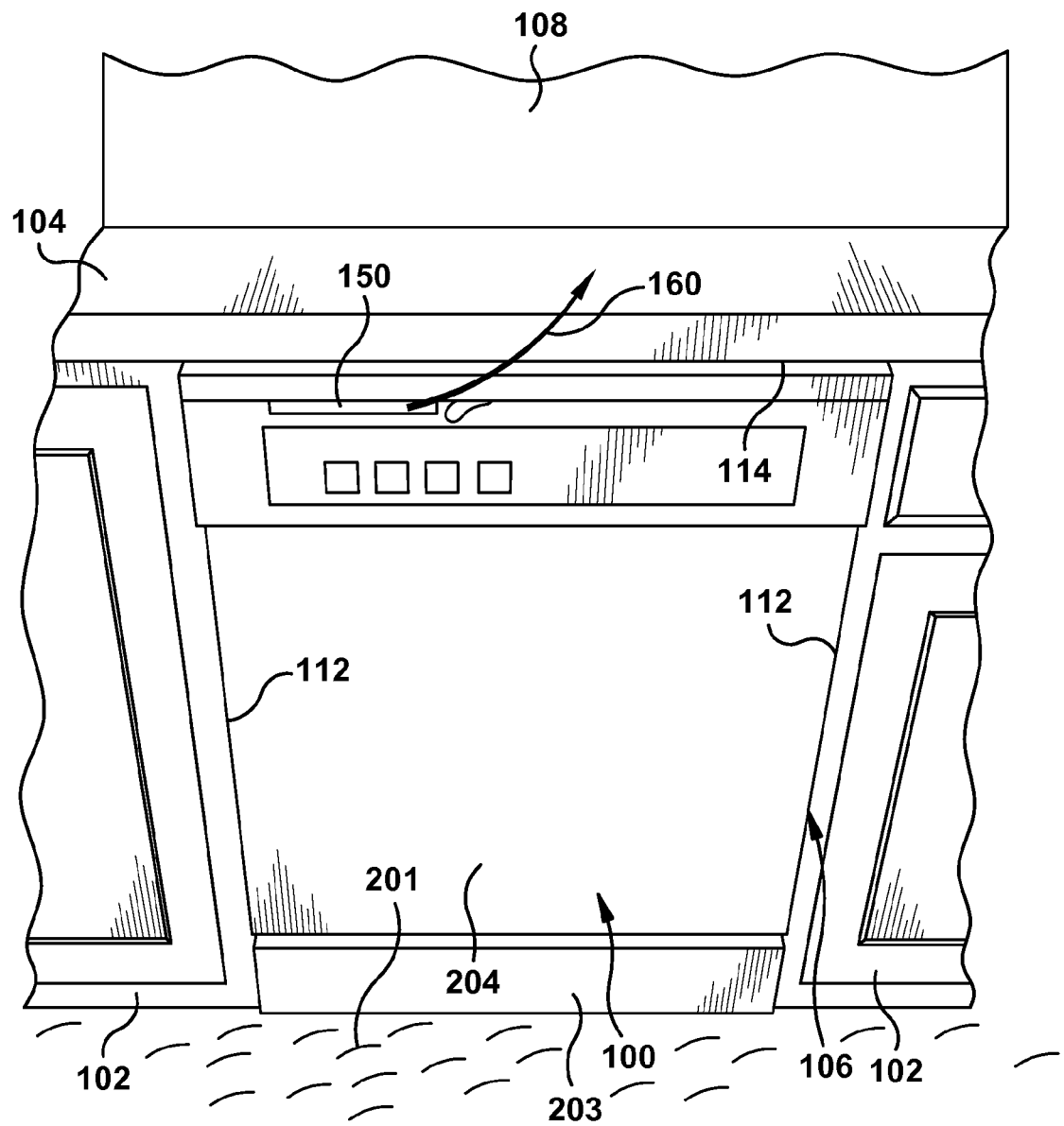
FIG. 1 shows a front view of a dishwasher installed in a cabinet under a countertop.
Figure 2:
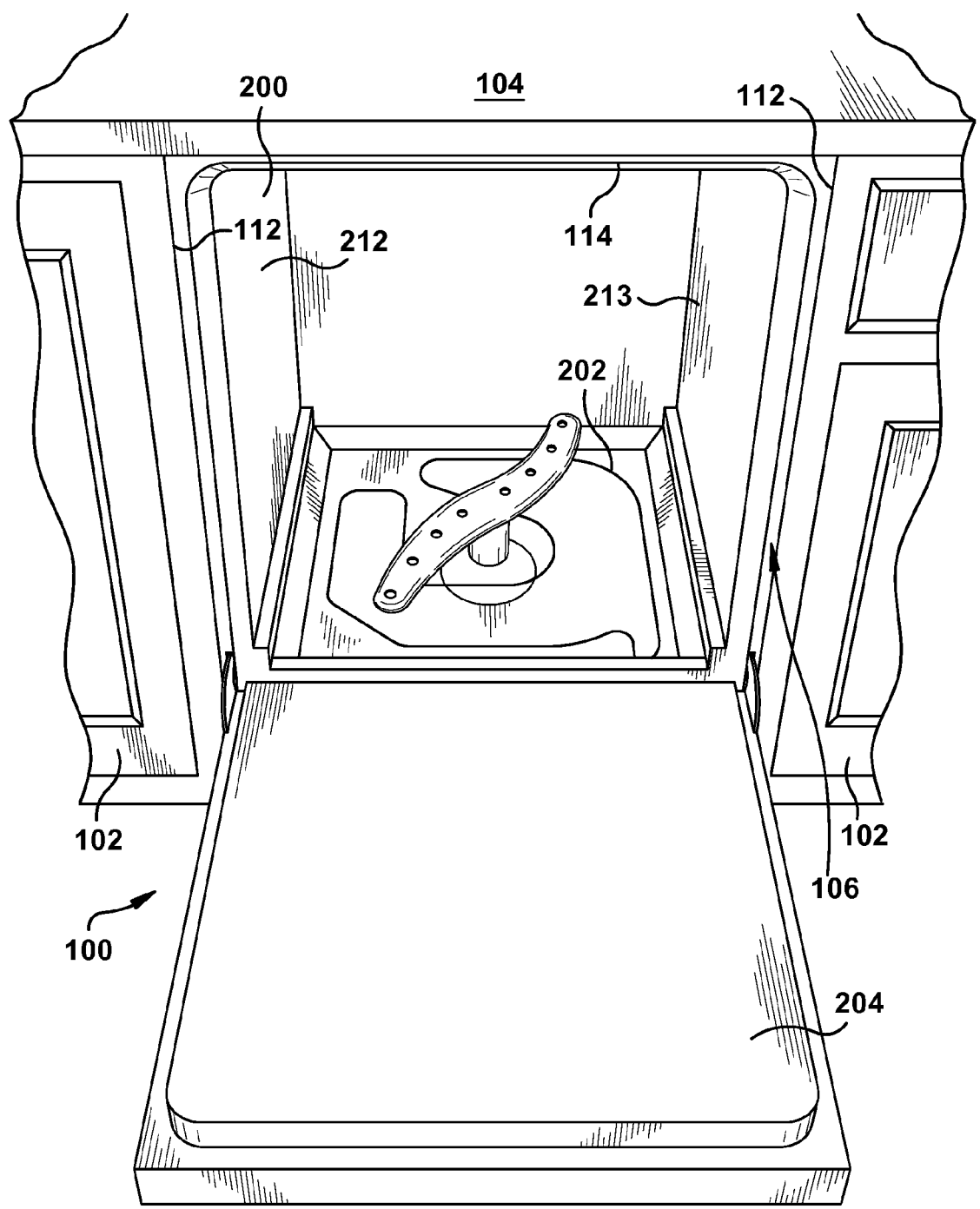
FIG. 2 shows a front view of a dishwasher with the front door opened.
Figure 3:
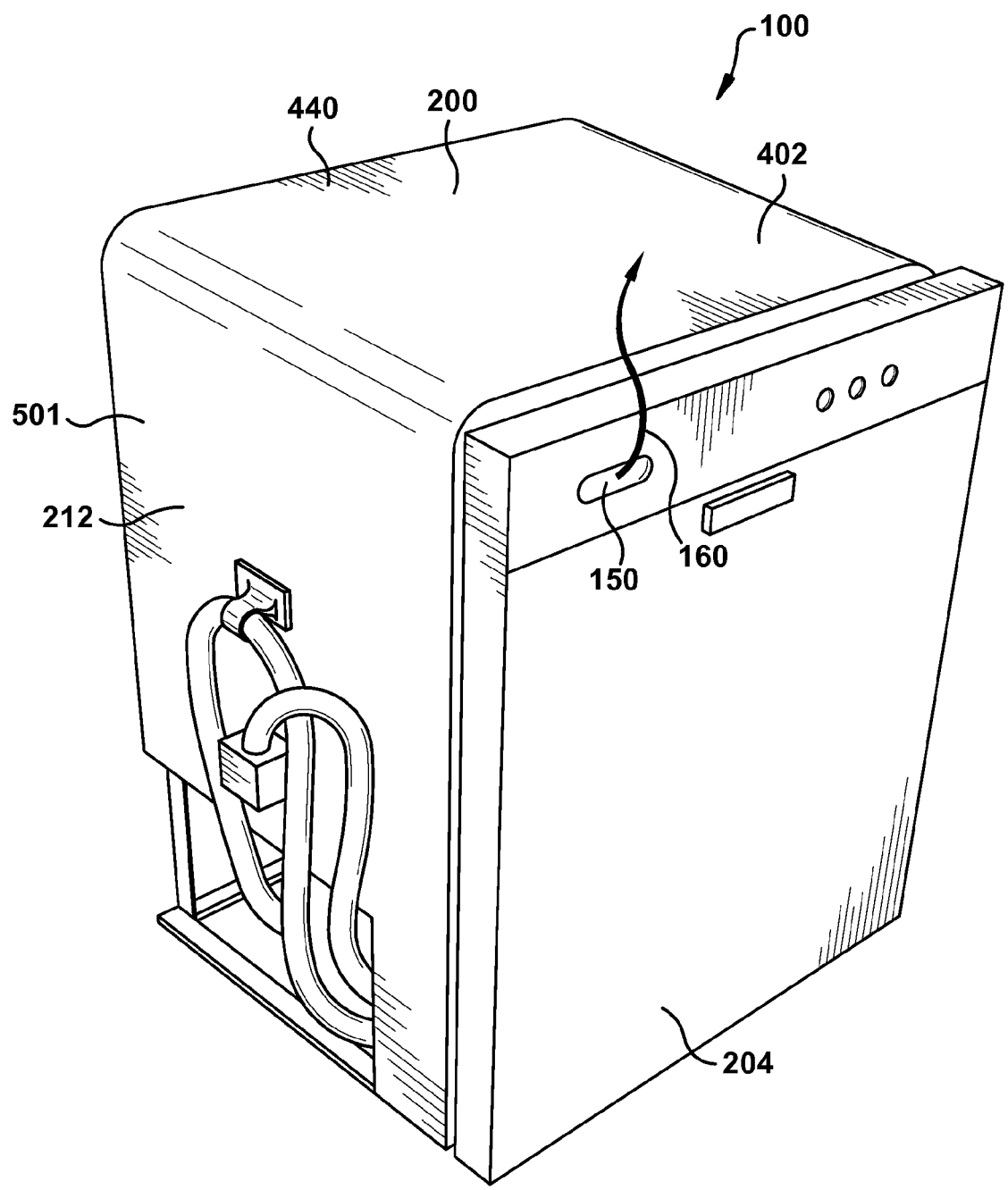
FIG. 3 shows a dishwasher without an insulation blanket removed from a cabinet and countertop.

FIG. 1 illustrates a dishwasher 100 installed between cabinets 102 and under a countertop 104. As such, a cavity 106 that the dishwasher is installed in is bounded by sides 112 of the cabinets 102, by the bottom 114 of the countertop 104, and by a wall 108 of the kitchen (see also FIGS. 7 and 8). FIG. 2 illustrates the dishwasher 100 with a door 204 open. The dishwasher includes a heating element 202, a tub 200, and the door 204. The tub 200 and the door 204 are spaced above the floor 201. A panel 203 is disposed in the space between the door 204 and the floor 201. This panel 203 is commonly referred to as a toe kick panel. The panel 203 provides an aesthetically pleasing appearance below the door 204 and blocks some noise from below the tub 200. In an exemplary embodiment, the tub 200 is made of a plastic or composite material, such as fiberglass reinforced plastic or other reinforced composite materials. In another exemplary embodiment, the tub 200 is made of a metal material, such as stainless steel.

In an exemplary embodiment, the dishwasher 100 also includes an exhaust vent 150. The exhaust vent 150 allows gas, such as water vapor that forms when water is heated in the washing and drying cycles of the dishwasher, to exit the dishwasher 100 as indicated by arrow 160. The exhaust vent can take a wide variety of different forms. The exhaust vent 150 can be through the door 204 as illustrated, but could be provided at other locations on the dishwasher. The vent 150 can take any conventional form. The acoustically insulated apparatus of the invention can encompass machines other than a dishwasher.

Figure 4A:
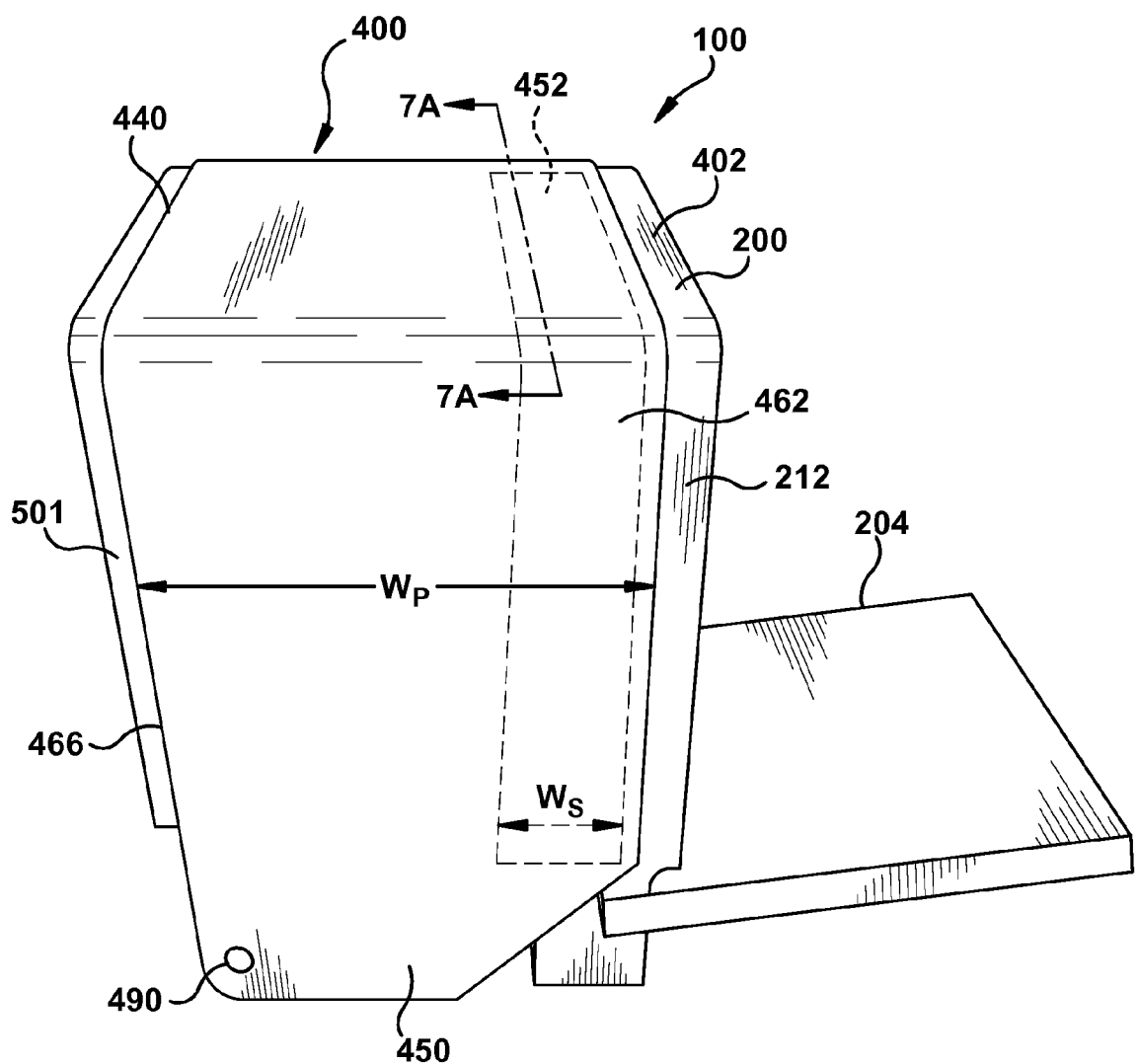
FIG. 4A is a perspective view of an exemplary embodiment of a dishwasher with an insulation blanket disposed on the tub.

Referring to FIGS. 4A, 7A, and 8A, in one exemplary embodiment, an insulation blanket 400 is provided over a top 402 and on sidewalls 212 of the tub. The insulation blanket 400 can be made from a wide variety of different materials and can have a wide variety of different configurations. In one exemplary embodiment, the insulation blanket 400 includes a sound absorbing layer 450 and a sound reflecting layer 452. U.S. Pat. No. 5,965,851 discloses insulation blankets for dishwashers that include sound absorbing layers and a sound reflecting layer. Any of the sound absorbing layers and sound reflecting layers disclosed by U.S. Pat. No. 5,965,851 can be used in the insulation blankets of the present application.

The sound absorbing layer 450 can be made from a wide variety of different materials. Examples of suitable materials for the sound absorbing layer 450 include, but are not limited to, fiberglass insulation, a non-woven synthetic material, a non-woven natural material and mixtures thereof. The sound absorbing layer 450 may be porous and can be any layer of sound absorbing material, such as a layer of foam material. Besides glass fibers, such fibers as other mineral fibers and organic fibers can be used. In some exemplary embodiments, fibers of the sound absorbing layer may be polyester fibers or polypropylene fibers. In one exemplary embodiment, the sound absorbing layer comprises one or more layers of VersaMat™ insulation available from Owens Corning. In one exemplary embodiment, the sound absorbing layer comprises one or more layers of the PliaTemp line of insulation products available from Owens Corning. It is believed that fibrous insulation materials are effective because the fibers therein tend to refract sound waves across the numerous air pockets contained in the material, which air pockets act to impede or dampen and thus lessen the sound energy. Typically, a fibrous glass insulation material has between about 5% and about 10% by weight of a phenolic resin binder such as phenol-urea-formaldehyde. The binder enhances the tensile strength of the fiberglass. Preferred fiberglass insulating materials are commercially available from Owens Corning, Toledo, Ohio. The material of the sound absorbing layer 450 may include thermoplastic fiber material, thermosetting fiber material, bi-component fiber material and mixtures thereof. Various polymers are particularly useful in the present invention. Still more specifically the material may be selected from a group consisting of polyolefin, polypropylene, polyethylene, polyester, nylon, rayon, polyethylene terephthalate, polybutylene terephthalate, cotton, kenaf, silk, cellulose, hemp, shoddy, fiberglass, and mixtures thereof.

In an exemplary embodiment where the sound absorbing layer 450 is made from fiberglass, the fiber diameter, and the density and thickness of the glass fiber blanket can be varied to modify the sound absorption characteristics of the insulation layer. Preferably the fiberglass insulating material has a relatively low density between about 0.5 pounds per cubic foot (8 kg/m.sup.3) and about 10 pounds per cubic foot (160 kg/m.sup.3), more preferably between about 0.5 pounds per cubic foot (8 kg/m.sup.3) and about 2 pounds per cubic foot (32 kg/m.sup.3), and most preferably between about 0.9 pounds per cubic foot (14.4 kg/m.sup.3) and about 1.7 pounds per cubic foot (27 kg/m.sup.3). For the clothes washer having a peak sound frequency of about 240 Hz., the glass fiber insulation preferably has a density of about 1.7 pounds per cubic foot (27 kg/m.sup.3) and a thickness of about 2 cm. The glass fibers in the insulating material preferably have an average diameter between about 3 and about 25 microns, and more preferably between about 3 and about 12 microns.

The sound reflecting layer 452 can be made from a wide variety of different materials. In one exemplary embodiment, the sound reflecting layer 452 is asphalt. A wide variety of other materials can also be used, such as heavy acoustic materials. For example, the sound reflecting layer 452 can be any acoustic material, such as any material having a density that is at least twice the density of the sound absorbing layer 450, at least three times the density of the sound absorbing layer 450, at least five times the density of the sound absorbing layer 450, or at least ten times the density of the sound absorbing layer 450.

In one exemplary embodiment, the sound reflecting layer 452 is a material that blocks all airflow, such as asphalt or mastic material. In another exemplary embodiment, the sound reflecting layer 452 allows some airflow through the material. One such sound reflecting layer that allows some airflow through the sound reflecting layer 452 is the PliaTemp family of products available from Owens Corning, such as Owens Corning PliaTemp 4000. In one exemplary embodiment, the sound reflecting layer 452 is a four mil thick layer of PliaTemp 4000 material. In one exemplary embodiment, the layers 450, 452 are tuned or tonal specific, which means that the layers 450, 452 are designed to provide maximum sound absorption at a specific frequency or within a specific frequency range or band. In this manner, the layers 450, 452 can be designed to be particularly effective in absorbing sound at the frequency which is the peak frequency of the noise emanating from the tub 200 or other machine. The reduction in sound transmission by absorption can be measured in sabines using the standard ASTM method E-1050. Noise absorption is measured on a scale from zero, meaning no sound is absorbed, to 1.0, meaning all the sound is absorbed.

The amount of sound transmitted through an object can be measured by a Sound Transmission Class ("STC") according to the standard ASTM method E90-90. The STC is measured on a scale in decibels, from zero decibels, meaning all the sound is transmitted, to approximately 70 decibels, meaning almost no sound is transmitted. The STC is a single number that represents the ratio of sound energy incident on or striking an object relative to the sound energy transmitted through the object. Usually the STC is measured over a range of frequencies. The STC for the acoustical insulation system of the invention is preferably within the range of from about 10 to about 50 decibels, and more preferably within the range of from about 20 to about 40 decibels.

In one exemplary embodiment, the sound reflecting layer 452 is a material that absorbs and retains a significant amount of heat. For example, the sound reflecting layer 452 can be any material that absorbs and retains at least twice the amount of heat that is absorbed and retained by the sound absorbing layer 450, any material that absorbs and retains at least three times the amount of heat that is absorbed and retained by the sound absorbing layer 450, any material that absorbs and retains at least five times the amount of heat that is absorbed and retained by the sound absorbing layer 450, or any material that absorbs and retains at least ten times the amount of heat that is absorbed and retained by the sound absorbing layer 450 during a saniwash cycle of a dishwasher. An example of a sound reflecting layer 452 that absorbs and retains a significant amount of heat is asphalt.

Although the sound reflecting barrier layer 452 is disclosed above as being asphalt, numerous other materials could also be applied to the layer 450 to provide a solid barrier for sound transmission through the product. For example, the sound reflecting barrier could be a thermoplastic adhesive such as a hot melt polymeric material, an example of which is hot melt adhesive No. 50-823, from Reynolds Adhesive, Greenville, S.C. The sound reflecting barrier could also be a thermoset adhesive, such as an epoxy adhesive. Other examples include water-based latex adhesives, such as aqueous adhesive No. 20983 from Northwest Adhesives, Minneapolis, Minn.

The type of asphalt used in the barrier layer 450 is not critical. The asphalt can be any bituminous material such as tars, pitches or asphalts. The asphalt can be any natural or petroleum derived asphalt. The common source of asphalt is the residue or bottoms from the petroleum refining industry which includes those commonly referred to as paving grade, roofer's flux, propane washed and air-blown.

The asphalt can optionally be modified with a polymer to give it improved flexibility during handling, and improved resistance to flow to prevent changes in thickness from top to bottom in the acoustical insulation system. A preferred polymer is a styrene/butadiene copolymer such as Kraton 1101 (31% styrene, 69% butadiene) from Shell Co., Houston, Tex. The weight ratio of asphalt to polymer is preferably between about 6:1 and about 20:1. The polymer can be mixed into the asphalt under high shear at 300.degree. F. (149.degree. C.) to 400.degree. F. (204.degree. C.). Another preferred polymer is formed by copolymerization of styrene-butadiene-styrene (SBS) thermoplastic rubber and styrene monomer. Other polymers that may be useful as asphalt modifiers include ethylene copolymers such as Elvax® 450 (ethylene vinyl acetate copolymer) or Elvaloy® AM (ethylene butylacrylate glycidyl methacrylate terpolymer) both made by Du Pont (Wilmington, Del.), Ultrapave 70® (SBR latex) made by Goodyear, polybutadiene, and polypropylene.

Various fillers can be incorporated into an asphalt layer 450 to increase the mass of the layer and thus reduce the amount of sound transmitted through the sound reflecting barrier and/or increase the amount of heat retained by the sound reflecting barrier. Preferably the filler is selected from calcium carbonate, magnesium silicate, talc, calcium oxide, clay, glass, mica, barium, and mixtures thereof. More preferably the filler is calcium carbonate because it is inexpensive and contributes significant mass. Preferably, the filler is added in an amount within the range of from about 40 to about 80 percent by weight of the total asphalt/filler blend. Additives can also be incorporated into the asphalt layer 40 to provide it with additional properties such as fire retardancy. The type and amount of filler can affect the flexibility of the product. The filler and the asphalt combination preferably has the quality of being relatively easy to cut so that the product can be easily fabricated.

In embodiments where the sound reflecting layer is made from asphalt, the asphalt may be within the range of from about 10 to about 150 lb/ft.sup.3 (about 160 to about 2400 kg/m.sup.3), and preferably at a density of about 110 lb/ft.sup.3 (about 1760 kg/m.sup.3). Typically, the asphalt layer has a thickness within the range of from about 10 mil to about 280 mils (about 0.25 mm to about 7.11 mm).

In an exemplary embodiment, the layers 450, 452 of the insulation blanket 400 are designed to provide maximum sound absorption at the peak frequency of the noise emanating from the noise producing machine. To do this, the blanket 400 may be designed with a natural frequency of vibration which approximates the peak frequency of the noise emanating from the machine, such that the asphalt layer transmits sound in a peak frequency range, and generally reflects other frequencies. In order to design the blanket 400 so that it has its maximum absorption at the peak sound frequency of the machine, the optimum parameters of the layers 450, 452 are determined. The density and thickness of the barrier layer 452 and the density, thickness and fiber diameter of the sound absorbing layer 450 are particularly designed such that the barrier layer transmits sound in the peak frequency range. The thickness of the sound absorbing layer 450 is designed particularly to cause interference in the manner described above for the peak frequency range.

Figure 6:
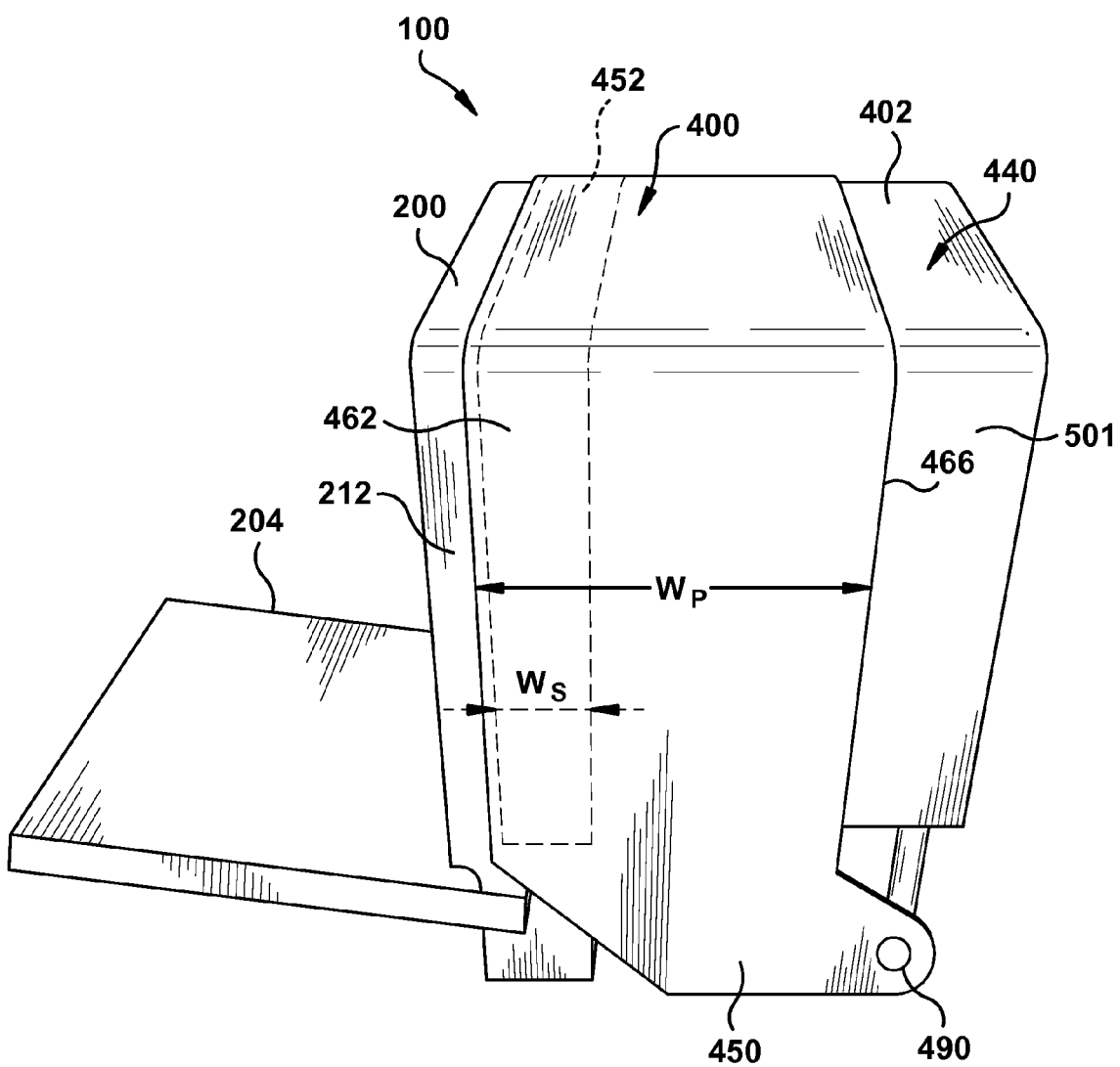
FIG. 6 is another perspective view of the dishwasher shown in FIG. 5.

The insulation blanket 400 can have a wide variety of different configurations. For instance, the blanket 400 illustrated by FIGS. 4A-4C covers substantially all of the rear portion of the tub and the blanket 400 illustrated by FIG. 6 leaves a rear portion 440 of the tub 200 exposed in the cavity 106. In other embodiments, separate blankets 400 may be provided on the sidewalls 212, of the tub, with no blanket provided on top of the dishwasher or a different material may be provided on top of the dishwasher. In an exemplary embodiment, the blanket 400 is configured to be somewhat compressed between the sides 112 of the cabinets 102 and the tub 200.

FIGS. 4A-8D illustrate exemplary embodiments of dishwashers 100. In each of these exemplary embodiments, the dishwasher includes a tub 200 having a top wall 402 and two side walls 212, and an insulation blanket disposed over the tub top wall and the two sidewalls. The insulation blanket comprises a sound reflecting layer 452 and a porous sound absorbing layer 450.

In an exemplary embodiment, the sound reflecting layer 452 is attached to the sound absorbing layer 450. This allows the sound reflecting layer 452 to be positioned only where it is needed in the door 204 (See FIG. 12) and/or on the outer surfaces of the tub 200. The flexibility of the positioning of the sound reflecting layer 452 allows for acoustic tuning of the tub 200. The attachment of the sound reflecting layer 452 to the sound absorbing layer 450 also positions the sound reflecting layer 452 on the tub 200 during shipping, without relying on an adhesive to hold the sound reflecting layer 452 in place. The sound reflecting layers 452 typically weigh 0.75 pounds to 1.5 pounds and the dishwashers are often subjected to extreme temperature ranges during shipment, such as from −20 to 140 degrees Fahrenheit. These factors make it more difficult to keep the sound reflecting layers 452 adhered to the tub 200 during shipping.

In the exemplary embodiments illustrated by FIGS. 4A, 5, 6, 7A and 8A, the sound reflecting layer 452 is disposed only under a forward portion of the porous sound absorbing layer 450. For example, the width $W_S$ of the sound reflecting layer 452 may be ½ or less of the width $W_P$ of the porous layer 450, the width $W_S$ of the sound reflecting layer 452 may be ⅓ or less of the width $W_P$ of the porous layer 450, or the width $W_S$ of the sound reflecting layer 452 may be ¼ or less of the width $W_P$ of the porous layer 450. For example, the width $W_S$ of the sound reflecting layer may be between 6 inches and 24 inches, between 6 and 18 inches, or between 6 and 12 inches. However, any width that meets the desired acoustical performance may be used. By positioning the sound reflecting layer 452 near the front of the washer, the sound reflecting layer 452 absorbs sound energy from the front of the tub, where is more likely to be emitted from the washer into the living area of the building. Sound is allowed to be transmitted through the rear 501 of the tub 200, but sound that is emitted at the rear of the tub is less likely to be emitted through the front of the washer, or will at least be quieter due to the distance. In the example illustrated by FIG. 4A, the sound reflecting layer 452 is a continuous strip disposed over the top wall 402 and against each side wall 212. FIGS. 7D and 8D, illustrate an exemplary embodiment that is similar to the embodiment of FIGS. 4A, 7A and 8A, except the sound reflecting layer 452 comprises three separate pieces, instead of a continuous strip.

Figure 4B:
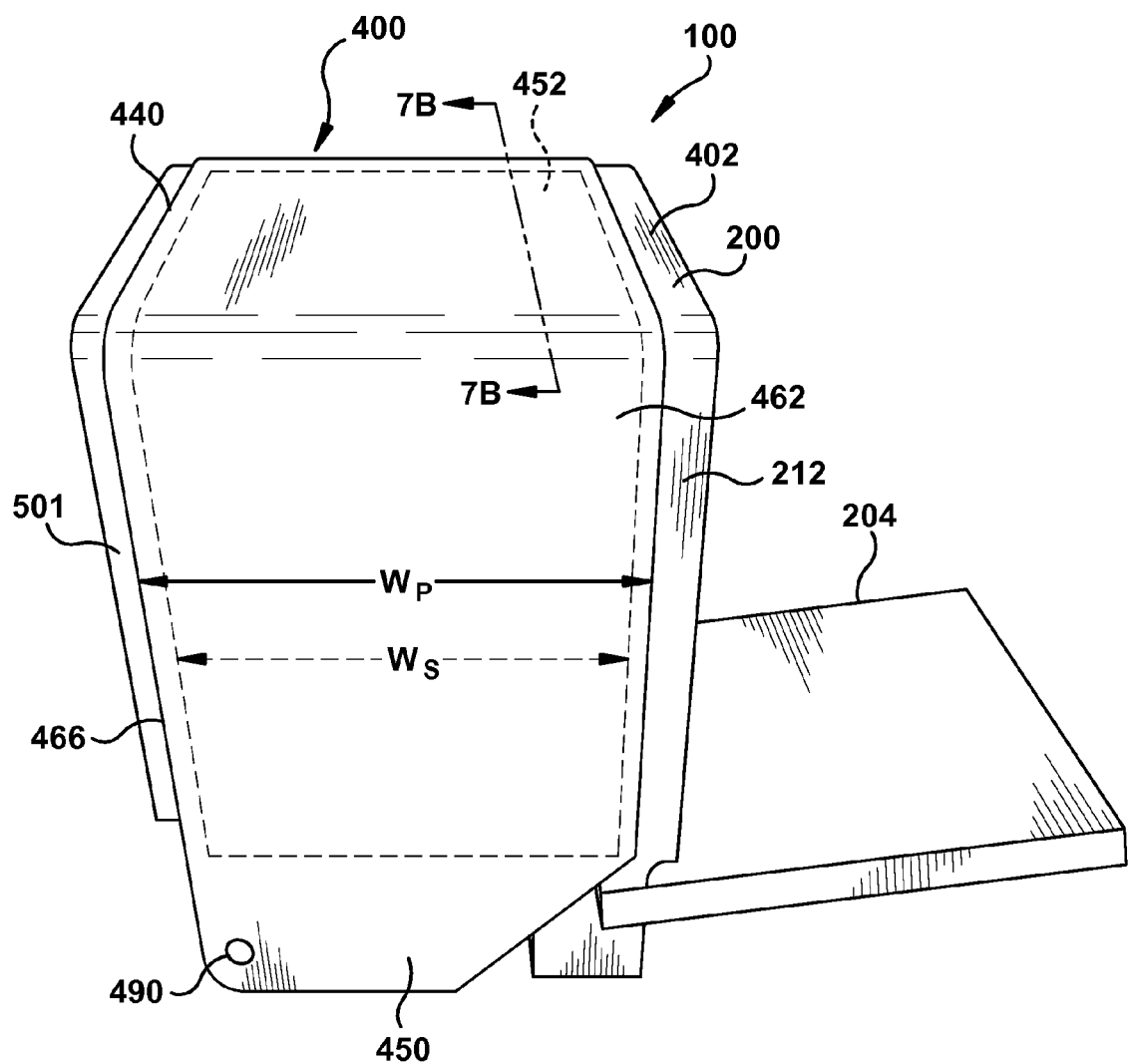
FIG. 4B is a perspective view of an exemplary embodiment of a dishwasher with an insulation blanket disposed on the tub.
Figure 4C:
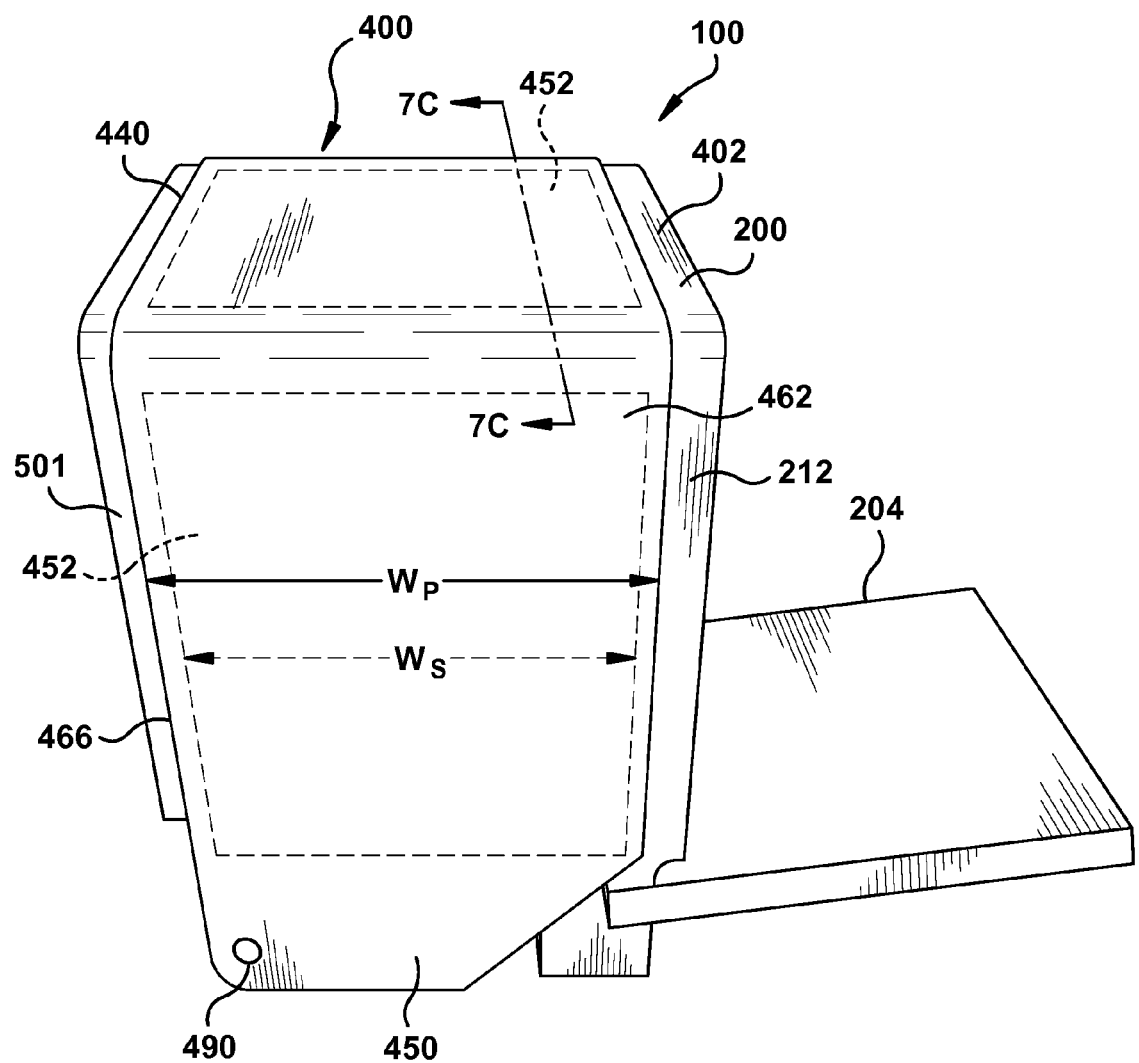
FIG. 4C is a perspective view of an exemplary embodiment of a dishwasher with an insulation blanket disposed on the tub.
Figure 5:
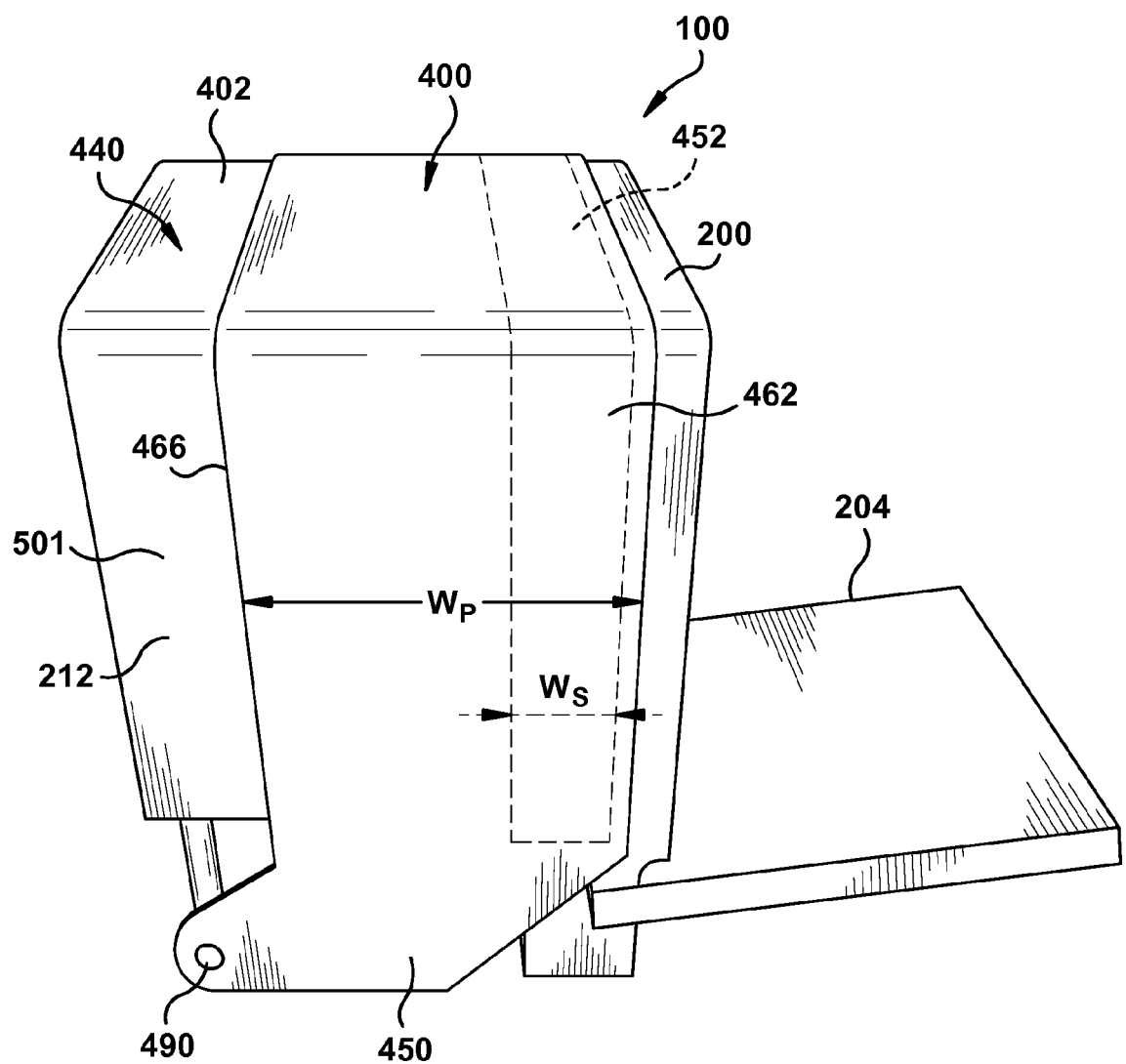
FIG. 5 is a perspective view of an exemplary embodiment of a dishwasher with an insulation blanket disposed on the tub.

In the exemplary embodiment illustrated by FIGS. 4B, 7B, and 8B, the sound reflecting layer 452 is disposed under a majority of the porous sound absorbing layer 450. For example, the width $W_S$ of the sound reflecting layer 452 may be ½ or more of the width $W_P$ of the porous layer 450, the width $W_S$ of the sound reflecting layer 452 may be ⅔ or more of the width $W_P$ of the porous layer 450, or the width $W_S$ of the sound reflecting layer 452 may be ¾ or more of the width $W_P$ of the porous layer 450. However, any width that meets the desired acoustical performance may be used. In the example illustrated by FIG. 4B, the sound reflecting layer 452 is a continuous strip disposed over the top wall 402 and against each side wall 212. FIGS. 4C, 7C and 8C, illustrate an exemplary embodiment that is similar to the embodiment of FIGS. 4B, 7B, and 8B, except the sound reflecting layer 452 comprises three separate pieces, instead of a continuous strip.

Referring to FIGS. 9A-9C, in one exemplary embodiment the sound reflecting layer 452 is connected to the sound absorbing layer. The sound reflecting layer 452 can be connected to the sound absorbing layer 450 in a wide variety of different ways. For example, the sound reflecting layer 452 can be attached to the sound absorbing layer 450 with fasteners, with an adhesive, and/or the sound reflecting layer 452 can be formed on the sound absorbing layer 450. FIG. 9A schematically illustrates a sound reflecting layer 452 attached to a sound absorbing layer 450 with fasteners 900. The fasteners 900 can take a wide variety of different forms. Examples of suitable fasteners include, but are not limited to staples, clothing attachment tags, and the like. Any fastener capable of attaching the sound reflecting layer 452 to the sound absorbing layer 450 can be used. FIG. 9B schematically illustrates a sound reflecting layer 452 attached to a sound absorbing layer 450 with adhesive 902. The adhesive can take a wide variety of different forms. Any adhesive capable of attaching the sound reflecting layer 452 to the sound absorbing layer 450 can be used. FIG. 9C schematically illustrates a sound reflecting layer 452 attached to a sound absorbing layer 450 by forming the sound reflecting layer 452 on the sound absorbing layer 450. The sound reflecting layer 452 can be attached to the sound absorbing layer 450 by forming the sound reflecting layer 452 on the sound absorbing layer 450 in a wide variety of different ways. For example, the sound reflecting layer 452 can be attached to a sound absorbing layer 450 by forming the sound reflecting layer 452 on the sound absorbing layer 450 in the manner described by U.S. Pat. No. 5,965,851.

Figure 10A:
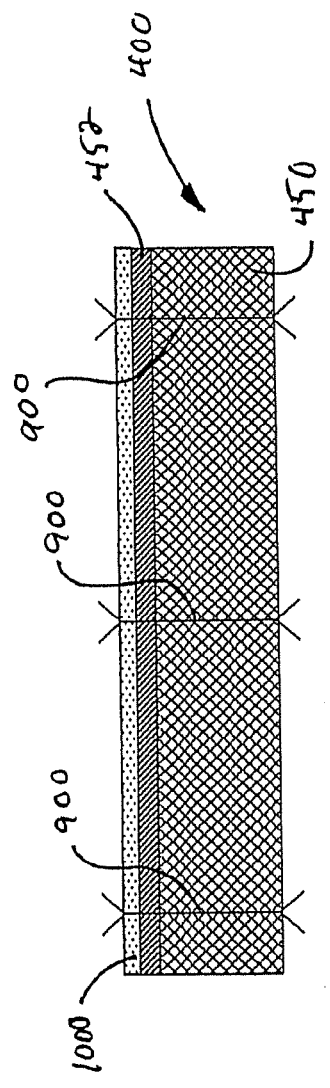
FIG. 10A is a sectional view of an exemplary embodiment of an insulation blanket.
Figure 10B:
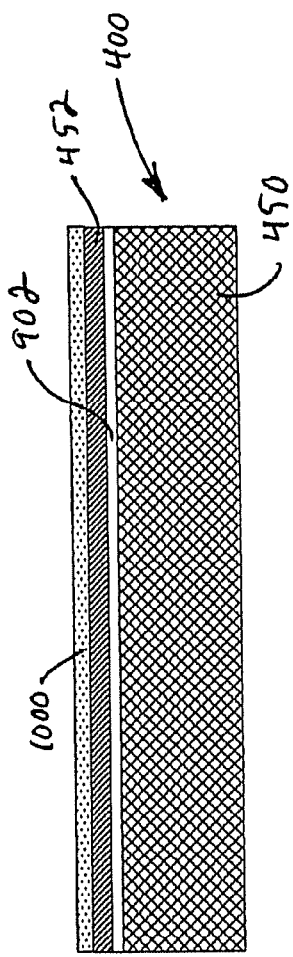
FIG. 10B is a sectional view of an exemplary embodiment of an insulation blanket.
Figure 10C:
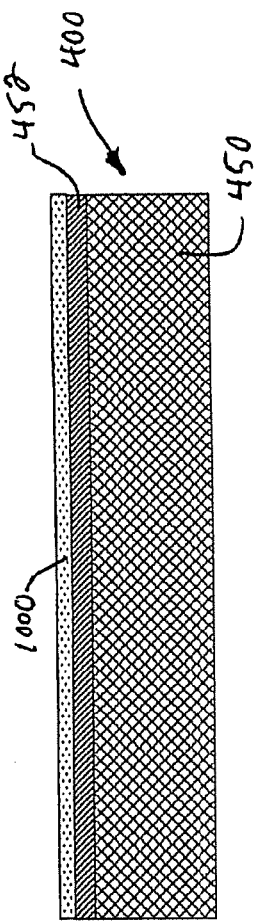
FIG. 10C is a sectional view of an exemplary embodiment of an insulation blanket.

Referring to FIGS. 10A-10C, in one exemplary embodiment an adhesive layer 1000 is included that adheres the sound reflecting layer 452 to the tub 200. The adhesive layer 1000 can take a wide variety of different forms. In one exemplary embodiment, adhesive layer 1000 is a heat activated adhesive layer that is configured such that operation of the dishwasher 100 activates the adhesive layer 1000 to bond the sound reflecting material to the tub. For example, the heat activated adhesive layer may be configured to be activated by heat that is generated during operation of the dishwasher and that is transferred through the tub 200 to the adhesive layer. In an exemplary embodiment, once the adhesive layer is heat activated by heat that is transferred through the tub, the adhesive layer 1000 permanently attaches the sound reflecting layer 452 to the tub. In one exemplary embodiment, the adhesive layer 1000 comprises a heat activated glue that activates below the sani-wash temperature of the dishwasher. For example, the sani-wash temperature of the dishwasher may be 156 degrees Fahrenheit. The first time the dishwasher is run, the adhesive layer 1000 would adhere to the surfaces of the tub 200. Prior to the first time the dishwasher is run, the sound absorbing layer 450 holds the sound reflecting layer 452 in place.

FIGS. 10A-10C illustrate exemplary embodiments of insulation blankets 400 that are similar to the insulation blankets illustrated by FIGS. 9A-9C, except the adhesive layer 1000 is disposed on the sound reflecting layer 452. The adhesive layer 1000 allows the sound reflecting layer 452 to be applied to a plastic dishwasher tub without baking the sound reflecting layer 452 onto the plastic dishwasher tub. This allows less expensive dishwashers with plastic tubs to achieve the same or similar acoustic levels as dishwashers with stainless steel tubs and baked on sound reflecting layers. In one exemplary embodiment, the insulation blankets 400 with adhesive layers 1000 are used on dishwashers with stainless steel or other metal tubs to eliminate the baking-on process and energy required in the baking-on process.

Figure 11C:
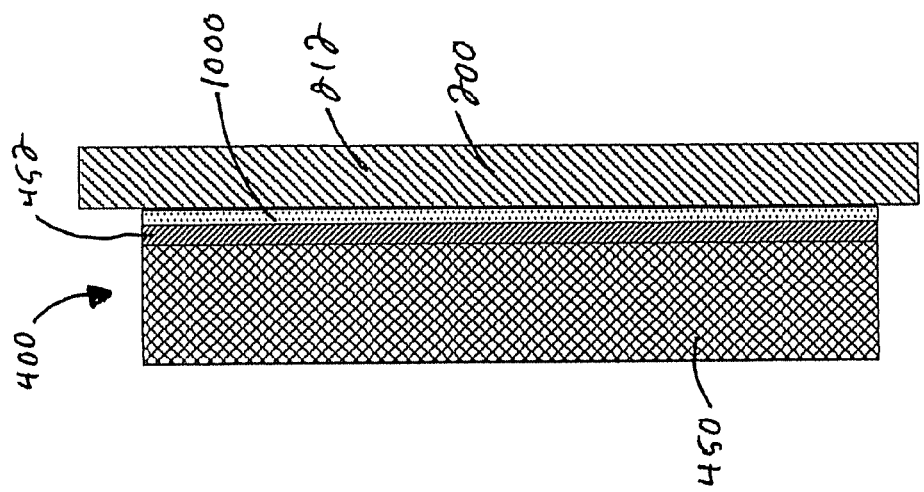
FIG. 11C is a sectional view of an exemplary embodiment of an insulation blanket on a dishwasher tub.
Figure 11B:
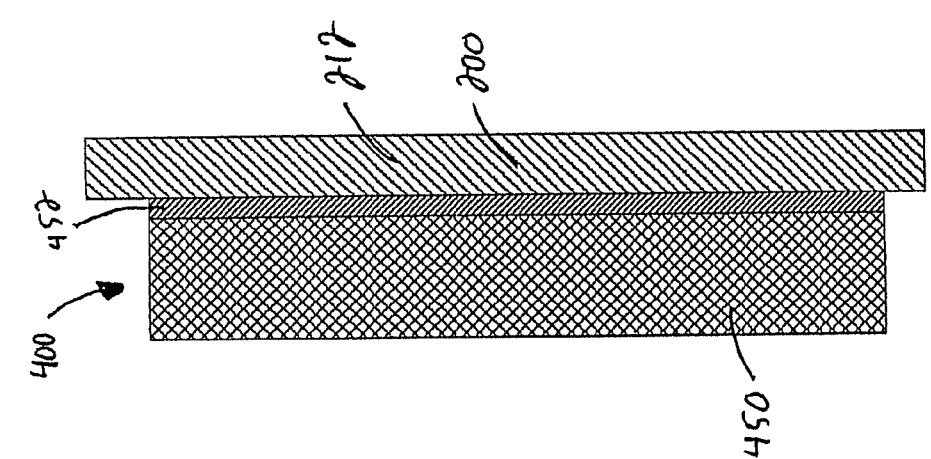
FIG. 11B is a sectional view of an exemplary embodiment of an insulation blanket on a dishwasher tub.
Figure 11A:
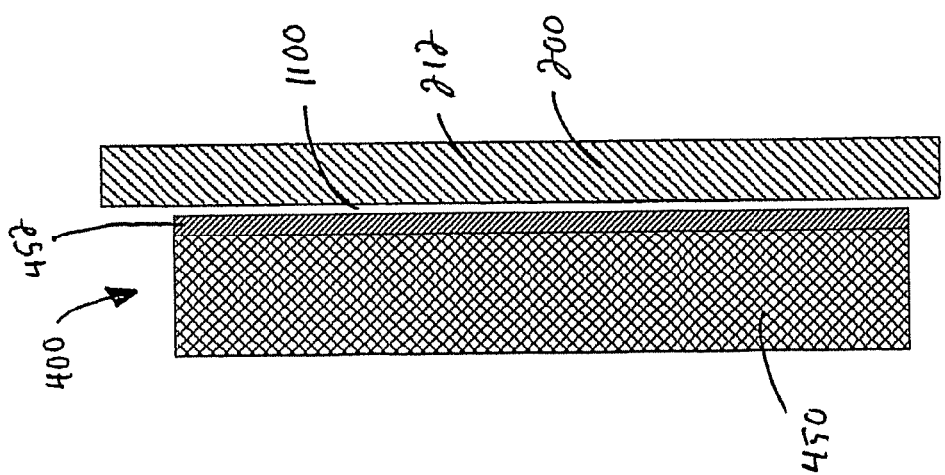
FIG. 11A is a sectional view of an exemplary embodiment of an insulation blanket on a dishwasher tub.

FIGS. 11A-11C illustrate exemplary embodiments of insulation blankets 400 positioned on a dishwasher tub 200. In the exemplary embodiment illustrated by FIG. 11A, a gap 1100 is provided between the sound reflecting layer 452 and the dishwasher tub 200. In the exemplary embodiment illustrated by FIG. 11B, the sound reflecting layer 452 is against the tub 200. The sound reflecting layer 452 may be adhered to the tub 200 by the material of the sound reflecting layer itself. For example, the sound reflecting layer 452 and/or the tub 200 may be heated up to adhere the sound reflecting layer to the tub. In another exemplary embodiment, the sound reflecting layer 452 may include an adhesive material or may be an adhesive material that adheres the sound reflecting layer 452 to the tub 200. The adhesive material included in the sound reflecting layer 452 can take a wide variety of different forms. In one exemplary embodiment, adhesive material included in the sound reflecting layer 452 is a heat activated adhesive layer that is configured such that operation of the dishwasher 100 activates the sound reflecting layer material to bond the sound reflecting material to the tub. For example, the sound reflecting layer 452 may be configured to be activated by heat that is generated during operation of the dishwasher and that is transferred through the tub 200 to the sound reflecting layer. In an exemplary embodiment, once the adhesive layer 1000 is heat activated by heat that is transferred through the tub, the adhesive layer 1000 permanently attaches the sound reflecting layer 452 to the tub.

Figure 12:
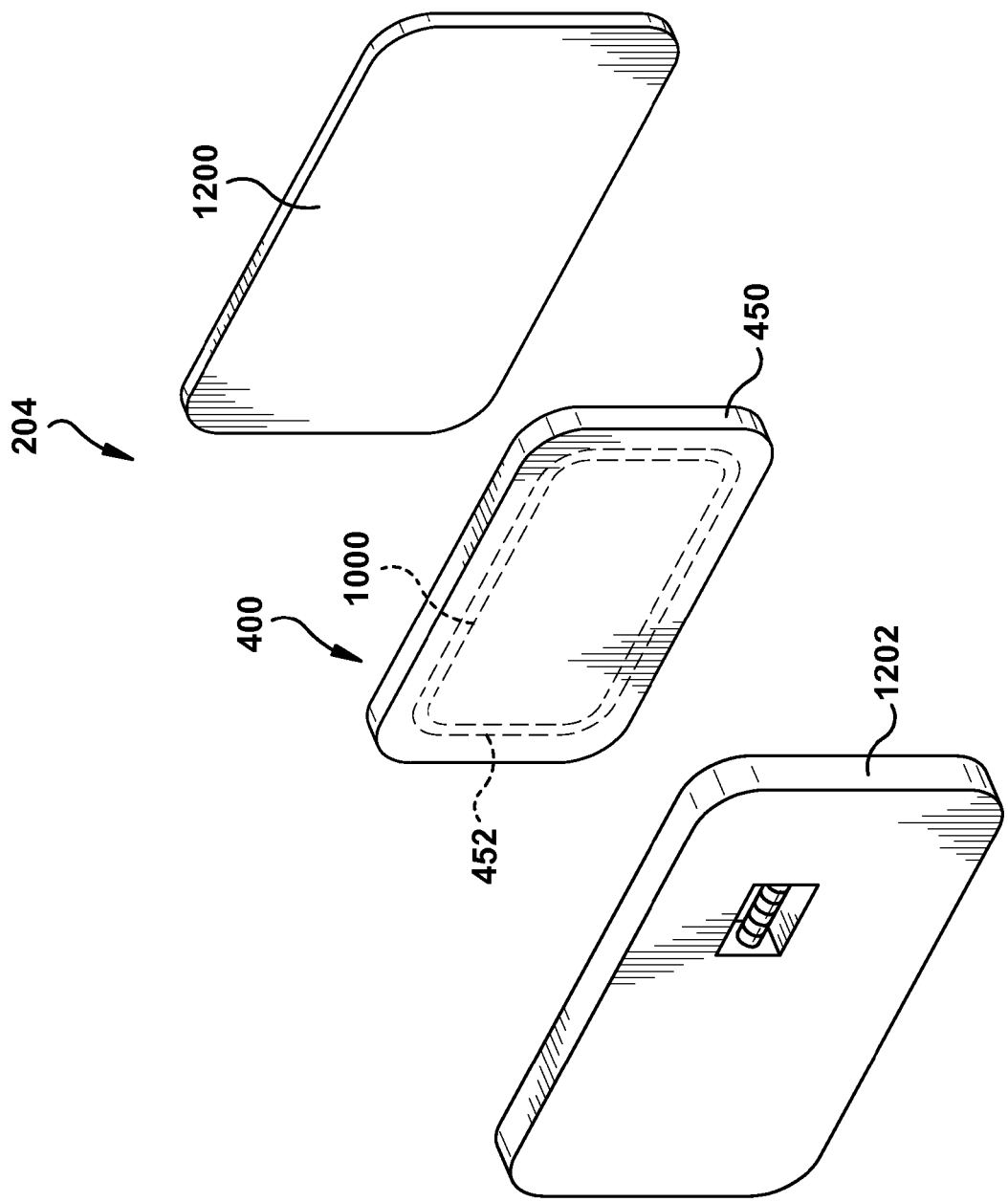
FIG. 12 is an exploded perspective view of an appliance door.

Referring to FIG. 12, in an exemplary embodiment an insulation blanket 400 having a sound absorbing layer 450 and a sound reflecting layer 452 is provided inside of the front door of the dishwasher. The insulation blanket can be made from any of the materials and have any of the configurations disclosed in this patent application. In one exemplary embodiment, the insulation blanket is adhered to an inside surface of an inner wall 1200 of the front door of the dishwasher by an adhesive layer 1000. The insulation blanket is sandwiched between the inner wall 1200 and an outer wall 1202. In one exemplary embodiment, adhesive layer 1000 is a heat activated adhesive layer that is configured such that operation of the dishwasher activates the adhesive layer 1000 to bond the sound reflecting material 452 to the inside of the front door. For example, the heat activated adhesive layer may be configured to be activated by heat that is generated during operation of the dishwasher and that is transferred through the door wall 1200 to the adhesive layer 1000. In an exemplary embodiment, once the adhesive layer is heat activated by heat that is transferred through the door, the adhesive layer 1000 permanently attaches the sound reflecting layer 452 to the door 204. In one exemplary embodiment, the adhesive layer 1000 comprises a heat activated glue that activates below the sani-wash temperature of the dishwasher. For example, the sani-wash temperature of the dishwasher may be 156 degrees Fahrenheit.

Referring to FIGS. 13A and 13B, in one exemplary embodiment, a dishwasher 100 is provided with insulation blankets 400 that are configured to move water or moisture from the front of the washing machine to the back of the washing machine after a wash cycle. This water or moisture management can be used to prevent moisture from condensing and forming droplets on a top wall 1300 of the tub 200 and/or on the inner wall 1200 (See FIG. 12) of the door 204. This prevents water from running down the door 204 when the door is opened after a wash cycle and/or prevents water from falling from the top wall 1300 onto the clean dishes after the wash cycle. In the exemplary embodiment illustrated by FIGS. 13A and 13B, the water or moisture is moved from the front of the washing machine to the back of the washing machine after a wash cycle by providing an insulation blanket 400 with a sound reflecting layer 452' in the door 204 and by providing an insulation blanket(s) 400 with a sound reflecting layer(s) 452 on the top wall 1300 and/or the side walls 212. In an exemplary embodiment, the sound reflecting layers are configured to absorb and retain heat. After the wash cycle, the heat that is retained by the sound reflecting layers 452, 452' is released through the door 204, the top wall 1300, and the side walls. This released heat drives moisture away that remains in the tub 200 away from the door 204, the top wall 1300, and the side walls 212 and toward a rear wall 1302 of the tub 200 as indicated by arrows 1304. The moisture accumulates and condenses on the rear wall 1302, rather than on the door 204, the top wall 1300, and/or the side walls 212. The insulation blankets 400 may have any of the configurations shown and/or described in the present application or any other configuration that drives moisture away from the door, 204, the top wall 1300, and/or the side walls 212. In the example illustrated by FIGS. 13A and 13B, the entire top wall 1300 or substantially the entire top wall 1300 is covered by a sound reflecting layer 452. In one exemplary embodiment, the rear wall 1302 has a slippery or low surface tension surface, so that moisture that accumulates on the rear wall runs down the wall and into a drain of the tub.

In an exemplary embodiment an insulation blanket 400 having a sound absorbing layer 450 and a sound reflecting layer 452 is provided inside of the panel 203 of the dishwasher. The insulation blanket can be made from any of the materials and have any of the configurations disclosed in this patent application. In one exemplary embodiment, the insulation blanket is adhered to an inside surface of the panel 203 by an adhesive layer 1000. In one exemplary embodiment, adhesive layer 1000 is a heat activated adhesive layer that is configured such that operation of the dishwasher activates the adhesive layer 1000 to bond the sound reflecting material 452 to the panel 203. For example, the heat activated adhesive layer may be configured to be activated by heat that is generated during operation of the dishwasher and to the panel adhesive layer 1000. In one exemplary embodiment, the adhesive layer 1000 comprises a heat activated glue that activates below the temperature seen by the panel when the dishwasher runs a sani-wash cycle. For example, the sani-wash temperature of the dishwasher may be 156 degrees Fahrenheit and the temperature.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not typically limited to any particular dishwasher. Thus, for example, use of the inventive concepts to both domestic and commercial dishwashers, are within the spirit and scope of the general inventive concepts. As another example, although the embodiments disclosed herein have been primarily directed to a dishwasher, the general inventive concepts could be readily extended to any unit which could benefit from the combination of the heating and insulating concepts disclosed herein. It is sought, therefore, to cover all such changes and modifications as fall within the spirit and scope of the general inventive concepts, as described and claimed herein, and equivalents thereof.

The invention claimed is:

1. A moisture management system for a dishwasher, comprising:
   a first insulation blanket disposed over a top wall and two side walls of a dishwasher tub;
   wherein the insulation blanket comprises a sound reflecting layer and a porous sound absorbing layer;
   wherein the sound reflecting layer is positioned between the dishwasher tub and the the porous sound absorbing layer; and
   wherein the sound reflecting layer retains heat from a wash cycle and releases the heat through the top wall and the two side walls, thereby driving moisture away from a front door of the dishwasher;
   wherein the sound reflecting layer is disposed over only a forward portion of the dishwasher tub and wherein a width $W_s$ of the sound reflecting layer is less than one half of a width $W_p$ of the porous sound absorbing layer to drive moisture from a forward portion of the tub toward a rearward portion of the tub.

2. The dishwasher of claim 1 further comprising an adhesive layer that adheres the sound reflecting layer to the tub.

3. The dishwasher of claim 2 wherein the adhesive layer is a heat activated adhesive layer that is configured such that operation of the dishwasher activates the adhesive layer to bond the sound reflecting layer to the tub.

4. The dishwasher of claim 1 wherein the sound reflecting layer is configured such that operation of the dishwasher bonds the sound reflecting layer to the tub.

5. The dishwasher of claim 1 wherein the sound reflecting layer covers less than one half of a surface of each side wall.

6. The dishwasher of claim 1 wherein the sound reflecting layer is a continuous strip disposed over the top wall and against each side wall.

7. The dishwasher of claim 1 wherein the sound reflecting layer comprises asphalt.

8. The dishwasher of claim 1 wherein the sound absorbing layer comprises fiberglass.

9. The dishwasher of claim 1 wherein the tub is a plastic tub.

10. A dishwasher installation, comprising:
    cabinets;
        a countertop disposed on the cabinets;
        wherein the cabinets and the countertop are arranged to form a dishwasher cavity;
    a dishwasher disposed in the cavity, the dishwasher comprising:
        a plastic tub having a top wall and two side walls;
        an insulation blanket disposed over the tub top wall and the two side walls wherein the insulation blanket is not fixedly attached to the tub prior to a first wash cycle;
            wherein the insulation blanket comprises a sound reflecting layer, a porous sound absorbing layer, and a heat activated adhesive layer; upon activation of the heat activated adhesive layer using heat generated during operation of the dishwasher at least, the adhesive layer fixedly attaches the blanket to the tub;
    thereby eliminating a need for a baking-on process.

11. The dishwasher installation of claim 10 wherein the sound reflecting layer is positioned against at least one of the two side walls of the plastic tub.

12. The dishwasher installation of claim 10 wherein the sound reflecting layer covers less than one half of a surface of each side wall.

13. The dishwasher installation of claim 10 wherein the sound reflecting layer covers a majority of each side wall.

14. The dishwasher installation of claim 10 wherein the sound reflecting layer is a continuous strip disposed over the top wall and against each side wall.

15. The dishwasher installation of claim 10 wherein the sound reflecting layer comprises asphalt.

16. The dishwasher installation of claim 10 wherein the sound absorbing layer comprises fiberglass.

17. The dishwasher installation of claim 10 further comprising:
    a front door having an inner wall and an outer wall;
    a second insulation blanket disposed in the front door between the inner wall and the outer wall wherein the second insulation blanket is not fixedly attached to the inner wall prior to a first wash cycle;
        wherein the second insulation blanket comprises a second sound reflecting layer that faces toward the inner wall, a second porous sound absorbing layer that faces toward the outer wall, and a second heat activated adhesive layer that is configured to adhere the sound reflecting layer to the inner wall of the door;

wherein the heat activated adhesive layer is configured such that operation of the dishwasher activates the heat activated adhesive layer to bond the sound reflecting layer to the inner wall of the door during operation of the dishwasher; thereby eliminating a need for a baking-on process.

18. The dishwasher of claim 17 wherein the the second sound reflecting comprises asphalt.

\* \* \* \* \*